United States Patent [19]

Heitz

[11] 4,274,043
[45] Jun. 16, 1981

[54] EFFICIENT, HIGH POWER BATTERY MODULE; D.C. TRANSFORMERS AND MULTI-TERMINAL D.C. POWER NETWORKS UTILIZING SAME

[75] Inventor: Robert G. Heitz, Concord, Calif.

[73] Assignee: The Dow Chemical Company, Midland, Mich.

[21] Appl. No.: 972,111

[22] Filed: Dec. 21, 1978

[51] Int. Cl.³ .......................... H02J 3/36; H02J 7/00
[52] U.S. Cl. .................................... 320/6; 307/151; 320/14; 320/15; 363/35
[58] Field of Search ..................... 320/7, 8, 14, 16, 18, 320/15, 6; 307/18–20, 77, 80, 82, 83, 150, 151; 363/35; 429/149

[56] References Cited

U.S. PATENT DOCUMENTS

| | | | |
|---|---|---|---|
| 312,698 | 2/1885 | Bauer | 320/18 X |
| 401,255 | 4/1889 | Currie | 320/6 X |
| 443,181 | 12/1890 | Rowland et al. | |
| 1,319,164 | 10/1919 | Montelius | 320/8 X |
| 1,626,097 | 4/1927 | Saikawa | 307/150 |
| 3,476,602 | 11/1969 | Brown et al. | |
| 3,909,685 | 9/1975 | Baker et al. | 307/151 X |
| 4,011,366 | 3/1977 | Bones et al. | |
| 4,061,955 | 12/1977 | Thomas et al. | 320/18 X |

FOREIGN PATENT DOCUMENTS

231575 7/1944 Switzerland .............................. 320/16

OTHER PUBLICATIONS

*EPRI Journal*, Jun. 1978, pp. 6–13, "The Reemergence of DC in Modern Power Systems".
*EPRI Project 225*, Final Report EM-264, Jul. 1976, vol. 1, pp. 1, 1–6 and 1–8 and vol. II, pp. 1, 3–69 through 3–80, "An Assessment of Energy Storage Systems Suitable for Use by Electric Utilities".
*IEEE Spectrum*, Dec. 1975, pp. 40–45, "Refining Copper With HVDC".
Progress Report For Jul.–Sep. 1976; Argonne National Laboratory.
*Science*, vol. 200, May 19, 1978, p. 754, "Itaipu: Direct Current Transmission".

*Primary Examiner*—Robert J. Hickey
*Attorney, Agent, or Firm*—R. R. Stringham

[57] ABSTRACT

Multiterminal, high voltage D.C. power networks in which the sub-terminals are electrically isolated from each other comprise D.C. transformers, as the terminals. Each transformer comprises a large number of efficient, high energy batteries, connected as two separate groups: one group made up of paralleled long strings of series connected batteries and the other group made up of paralleled short strings of one or more batteries each. Each transformer also comprises automatic monitoring, control and switching means for periodically exchanging charged and discharged strings between the two groups, one of which—the "primary"—is connected across the supply lines from the power source(s) for the network and the other of which—the "secondary"—is connected across the service lines providing power to users thereof.

18 Claims, 11 Drawing Figures

MULTITERMINAL HIGH VOLTAGE DC NETWORK

MODULES OPERATING in CHARGE and DISCHARGE MODES

MODULE ROW DISCHARGING THROUGH LB-2 LOAD BREAKERS

BIMODAL CHARGE/DISCHARGE LOAD BREAKER, BATTERY and DISCONNECTS

% ON-TIME and % LOSS vs % LOAD, when CHARGE-DISCHARGE CYCLE is so SHORT that OPEN CIRCUIT VOLTAGE is ESSENTIALLY EQUAL to AVERAGE of CLOSED CIRCUIT CELL VOLTAGES CONFIGURATIONS of each of 10 PRIMARY STRINGS (in Step-Down Transformer) at SUCCESSIVELY LOWER LOADS

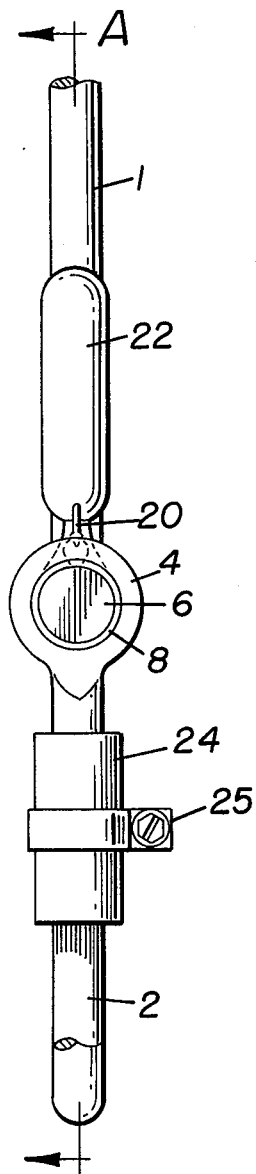
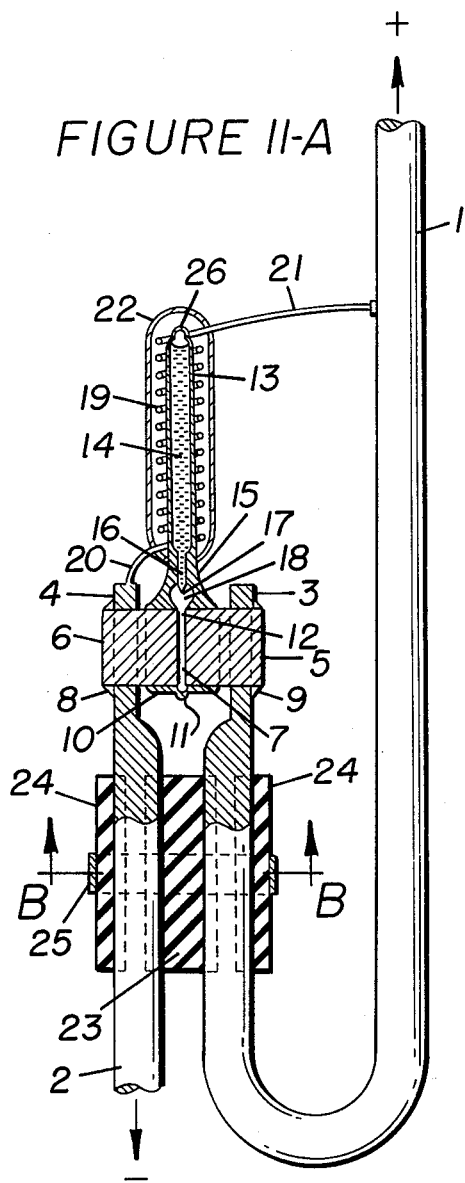
FIGURE II
FIGURE II-A
FIGURE II-B

EFFICIENT, HIGH POWER BATTERY MODULE; D.C. TRANSFORMERS AND MULTI-TERMINAL D.C. POWER NETWORKS UTILIZING SAME

BACKGROUND OF THE INVENTION

An important factor in the present worldwide energy crisis is the cost of energy transportation. In general, energy is more economically transported in the form of nuclear fuel, oil or natural gas than as electricity. In the case of coal, the cost balance is close enough to be tipped either way, depending on circumstances. However, the energy contents of geothermal reservoirs, tides, wind flows, hydraulic heads and gases of low BTU content are definitely not economically transportable over any substantial distance in forms other than as electricity. The latter types of energy sources are being more intensively exploited and it is becoming increasingly important to find ways of decreasing the costs of transmitting electrical power over long distances.

For the high voltages which are most efficient for electrical power transmission, the cost for D.C. transmission lines is considerably lower than for A.C. lines, particularly for underground installations. Also, D.C. systems respond more rapidly to control, avoid the frequency control problems of A.C. systems and offer certain advantages for sea crossings.

Additionally, D.C. is particularly suitable for links between non-synchronous A.C. networks. A further reason to consider D.C. transmission is the increasing need to generate excess power during off-peak periods and store it in an instantly available form for subsequent use during peak demands. Still another consideration is that a great deal of power is consumed as D.C. in end uses such as electrochemical plants, traction devices, elevators and steel mill rolls. Even those uses for which A.C. is preferable could better be served in many cases by individual solid state D.C. to A.C. inverters providing variable frequency control. Thus, it is apparent that there are a number of factors which favor D.C. for power transmission.

Unfortunately, the terminal stations required at the ends of D.C. lines are more expensive than the corresponding ones for A.C. lines. As a rough rule of thumb, the savings in line costs offered by D.C. tend to outweigh the greater terminous costs for lines which are over 300 miles (480 kilometers) long. However, the overall advantage would be more marginal for multi-terminal systems, since terminal costs would constitute a greater proportion of the total costs for such systems. This is a particularly important consideration in view of the advantages of multi-terminal systems (which advantages have been realized for D.C. only at voltages substantially lower than those employed for long distance power transmission).

It is thus apparent that a reduction in terminal costs is essential to fully realizing the inherent advantages of high voltage D.C. (HVDC). A large part of D.C. terminal costs are for A.C. to D.C. and D.C. to A.C. converters (rectifiers and inverters). The most efficient way to supply high voltage D.C. is by rectifying the high voltage output from a step-up transformer operated on relatively low voltage A.C. generated in a conventional power plant. Similarly, almost without exception, the conventional method of utilizing HVDC is to convert it to high voltage A.C. (invert it) and then step the A.C. down to end use voltages through one or more transformers. The latter procedure is followed even when the end use contemplated requires D.C. (end uses for D.C. at typical line voltages are rare or non-existent).

An important reduction in D.C. terminal costs was achieved when it became possible to replace mercury arc rectifier tubes with banks of "high current" thyristors (silicon-controlled rectifiers or SCR's). However, the necessity for employing relatively large numbers of thyristors in series, to accommodate the line voltages involved, results in installations which are still relatively large and expensive. This is well illustrated by the "valves" employed in a long-line, D.C. system which is being developed in the Republic of Zaire to supply power for electrolytic refining of copper.

In the Zaire system, which is representative of the current state of the art, hydropower is used to generate A.C. which is stepped up to 220 kv, rectified to ±500 kv D.C., transmitted a thousand miles (1600 kilometers), inverted to A.C., stepped down and again rectified to D.C. for use in the copper mills. The converters at the ends of the line are designed for a normal operating load of 560 megawatts and each includes a total of twelve valves. The valves consist of modularized strings of a large number of thyristors in series and are paired vertically. Each pair, together with the requisite auxiliary equipment, requires a structure 15.3 meters (~48 feet) high, 4.1 meters (~13 feet) wide and 2.65 meters (~8 feet) deep.

The Zaire system is not a multiterminal network and thus does not have to accommodate the switching and control requirements for operating such a network.

In multiterminal A.C. networks, the various terminals can be connected to or disconnected from the line by operation of A.C. circuit breakers capable of handling the volts and amps involved. However, comparable high voltage D.C. circuit breakers are not yet readily available and the conventional approach would be to include at least an inverter circuit, followed by an A.C. breaker at each different terminal, if operation of a really high voltage, multiterminal D.C. system were contemplated.

It has been recognized for some time that development of really efficient high voltage devices for stepping down D.C. from line to terminal voltages ("D.C. transformers") would strongly influence the choice between A.C. and D.C. power distribution systems.

Two different types of D.C. transformers which have received attention in recent years are dynamo-electric rotary transformers and solid state electronic devices which convert D.C. at one voltage to D.C. at a different voltage.

U.S. Pat. No. 3,875,495 (1975) discloses a method of reducing power losses and armature reactions in D.C. dynamos adapted by additional brush sets to function as D.C. transformers. The improvement is said to make practical the use of such transformers to provide smoothly variable voltages for control of D.C. motors and to achieve automatic regenerative braking of the same. It is not proposed to use this type of transformer in power transmission systems and it does not appear that such transformers could be employed at the voltages which would be encountered.

The several known kinds of electronic D.C./D.C. transformers are either "choppers", in which the source voltage is reduced by off/on switching, or are devices which process the power in a D.C. to A.C. (or varying D.C.) to D.C. sequence. Wattage ratings of more than about 1 KW, for either type of device, require the use of thyristors.

The highest wattage rating found in the literature for an individual chopper device is 50 KW for short-term operation and 25 KW for sustained operation: *Mormon, Ramsey and Hoff; IEEE Transactions on Industry Applications, Vol. IA-8, No. 5; Sept./Oct.* 1972. The preceding ratings are for operation on a supply voltage of 250 VDC.

The highest wattage rating found for a D.C./A.C./D.C. converter is 0.2 MW for a four thyristor, four diode module operating with a current load of 330 amperes and a supply voltage of 750 VDC: *Schwarz and Klaassens; IEEE Transactions on Industrial Electronics and Control Instrumentation, Vol. IECI-23, No. 2, May* 1976. (The 0.2 MW rating is a design rating; the highest wattage attained with an actual module was 10 KW.) Assuming that the 0.2 MW rating could be attained with the described module at the voltages and amperages employed in the above discussed Zaire system, the number of the latter modules required to handle the 560 MW power load in a single terminal in a comparable system would be 560/0.2, or 2800 modules. This would require 11,200 thyristors (and an equal number of diodes). Further, each module would include a saturable core A.C. transformer component.

Thus, it is not apparent from the literature that electronic D.C. transformers offer a practicable alternative to A.C. transformers in HVDC systems.

A third type of "device" which may be described as a D.C. transformer is simply an array of batteries which, in step-down operation, are charged in series across a D.C. power supply and then connected in parallel across a load and discharged. By using several battery sets which are successively cycled between charge and discharge and by appropriately timed switching, an essentially continuous D.C. ouput is obtained.

Since the advent of practical A.C. power systems, around the turn of the century, little or no attention has been paid to battery type transformers. The use of large numbers of batteries for storing off-peak power at power distribution sites has been discussed but supplying power to and retrieving power from the sites at different voltages, or as D.C., has not been suggested.

It is of course evident that power transmitted to a distant terminal could also be battery stored. However, the possibility of using the same batteries to step down the (D.C.) line voltage does not appear to have been considered. This may be attributable to the fact that the voltages employed and the electrical efficiencies realized in the prior art battery type transformers were relatively low.

The state of advancement attained in the battery type transformer art at its apparent prior zenith can be judged from U.S. Pat. No. 443,181 (1890), which is directed to a D.C. distribution system having one or more terminals, each comprising several sets of batteries successively switched back and forth, by a rapidly rotating commutator, between a "high" tension charging circuit and a low tension discharge ("consumption") circuit. The contacts on the commutator "overlap", in the sense that a given set of batteries is not disconnected from a circuit (charge or discharge) until after a second set has been connected in parallel with the first set. (At no time is any set connected in both the charge and discharge circuit).

The following considerations show that if the charging voltage (in the latter system) exceeds a certain value, arcing will occur when the first set of batteries is disconnected from the charging circuit, even though the parallel circuit leg through the second set remains unbroken. The effective voltage across the commutator contacts is the difference between the applied charging voltage and the back emf of the battery (or string) and is equal to the internal IR drop in the battery (or string). If the effective voltage exceeds about 20 volts, arcing will occur as the circuit is broken and the arc will persist until the contacts have been separated a certain distance.

The higher the internal resistance of the battery, the greater the effective voltage across the contacts will be (at a given charging rate). However, even if the resistance is low enough so that the IR drop is only 5% of the applied voltage, the latter voltage cannot exceed about (100/5)20, or 400 volts, if arcing is to be avoided. Furthermore, the only way in which 90% cycle efficiencies can be attained with commercially available batteries is to operate them at impractically low amperage rates. In fact, cycle efficiencies substantially in excess of 80% (IR loss $\sim$10%) have not been realized in laboratory testing of currently available batteries, according to a recent survey: *An Assessment of Energy Storage Systems Suitable for Use by Electric Utilities, Final Report, Vol.* II, *Electric Power Research Institute Project* 225, *July* 1976.

Thus, the use of battery-type D.C. transformers as a replacement for conventional converters in HVDC terminals is not indicated by the prior art.

It is evident that the prior art does not suggest any practical method of eliminating the need for AC transformers in HVDC systems—particularly in multiterminal systems—and does not contemplate dual function utilization of storage batteries in such systems.

OBJECTS OF THE INVENTION

A primary object of the present invention is to provide an economic battery module having utility not only for off-peak power storage but also as a component of D.C. (step-down or step-up) transformers.

Another main object is to provide a D.C. transformer which can function as the principal component of a D.C. line terminal and enables that terminal to be disconnected from the line without disrupting the rest of the system.

A further object is to facilitate the adaptation of multiterminal D.C. systems to the high voltages employed for long distance power transmission.

An additional object is to provide a novel method of voltage regulation which is particularly appropriate for battery-type D.C. transformers.

Yet another object is to provide a method of isolating terminals in a multiterminal D.C. system which does not employ saturable-core transformer components.

It is also an object of the invention to utilize a plurality of rechargeable batteries for both power storage and voltage scaling, in a D.C. distribution system.

Still another object is to provide a D.C. step-down transformer which is suitable for high voltage applications but does not require conventional circuit breakers for non-fault shutdowns or a large number of SCR's to handle the switching required to operate the transformer and to disconnect it (other than for fault clearance) from the high voltage lines.

A corollary but highly important object is to provide a D.C. transformer which can function as its own load breaker, i.e., to interrupt the flow of non-fault current through it from a high voltage transmission line or to a power consuming load.

It is also an object of the present invention to afford the considerable advantage of a type of terminal installation which can continue to service its demand load (for a limited period), even though the power supply to the system is shut down (as for fault correction).

SUMMARY OF THE INVENTION

The foregoing objects are attained by the present invention, which—in its broadest aspect—is a module comprising a battery of efficient, high power rechargeable cell units, automatic means for by-passing any units which fail, fuse means, automatic voltage and current monitoring means and switching means responsive to a separate control means activated by said monitoring means according to pre-established criteria.

More precisely, the foregoing module may be defined as: a high power battery module adapted for use in D.C. transformers and multiterminal D.C. power distribution systems based on such transformers, said module comprising:

(a) a battery of series-connected, rechargeable cell units, said battery having an open circuit voltage ($E_{oc}$) of at least 400 volts and each of said cell units consisting of a single cell or a plurality of cells in parallel and being capable of maintaining an electrical efficiency of about 95% or more while being continuously cycled for a period of at least 1000 hours, from the open circuit voltage ($e_{oc}$) it has when fully charged to a lesser $e_{oc}$, and back, at an average rate of at least 80 watts per pound of electrochemically reactive materials in the cell unit, said efficiency being defined as $100(W_o/W_i)$, where $W_o$ is the total watt-hours delivered by the unit and $W_i$ is the total watt-hours supplied to it, (b) an individual means associated with each of said cell units and adapted to respond automatically to development of an excessive load voltage across said cell unit by establishing a by-pass connection across it so that the series circuit through the battery is maintained, (c) individual fuse means connected one to one in series with each of said cells, (d) switching means operable by control signals to make or break a discharge circuit through said battery and to break or make a charging circuit through said battery,
said switching means comprising a connect/disconnect switch connected through an intervening solid state load breaker to one of the poles of said battery and another connect/disconnect switch connected to the other pole, (e) automatic monitoring means for determining the voltage across said battery and the current therethrough, (f) means for transmitting said voltage and current information to a control means, and (g) means for transmitting said control signals to said switching means.

In addition to the individual cell fuses, each module (or string) preferably includes a series connected fuse means designed to "blow" at an amperage less than c multiples of the amperage at which the individual cell fuses will blow, c being the number of (paralleled) cells per cell unit. Of course, the module (or string) fuse must be rated for an appropriately higher withstand-voltage.

In the foregoing definition, and hereinafter, when reference is made to connections between modules, this essentially means connections between the battery components of the modules, through the intervening load breakers and switches.

In another aspect, the invention is a plurality of the above defined modules adapted to function, together with auxiliary means, as a transformer but also having utility for power storage. In this aspect, the invention may be broadly defined as:

a plurality of said modules, in combination with said control means, so interconnected with each other—through said switching means—and so connected with said control means—through said monitoring and transmitting means, as to be operable as a self-regulating, D.C. step-up or step-down transformer having electrically separate primary and secondary circuit sections, one of said circuit sections comprising a plurality of short legs connected in parallel and the other comprising a plurality of long legs connected in parallel, each short leg comprising one of said modules or a plurality of same in series connection, the total number of the latter modules therein being x, and each long leg comprising a series string of N of said modules, the number of legs in each of said primary and secondary sections being at least equal to the ratio of the total current through the section to the maximum permissible current through the individual component cell units in said modules, said switching means being adapted so as to be able, upon receipt of said control signals, to:

(a) disconnect one or more discharged secondary legs at a time and to subsequently connect the modules of which the latter legs consist to form at least one new leg for the primary and connect said new legs in the primary, (b) disconnect one or more old primary legs at a time and to subsequently connect the modules of which the latter legs consist to form at least one new secondary leg and connect said new secondary legs in the secondary, said control means being adapted to (1) determine, from the information provided by said monitoring means, what the open circuit voltage and internal resistance of each battery in the transformer is, (2) in accordance with said pre-established criteria, including the permissible internal volt-amperes losses, the relationship between $e_{oc}$ and ampere-hours capacity during charge and discharge of the cells of which the batteries are composed and the magnitude of the discharge current through the secondary, to determine when each of said legs should be taken off or put on discharge or charge, (3) to develop said control signals and to provide same, through said transmitting means and at appropriate intervals, to said switching means, so that the batteries comprised in said short and long legs are repeatedly and alternately charged and discharged between preselected, higher and lower, open circuit voltages.

The term "at full load" refers to the condition of the transformer when L=1, i.e., the current demand on the secondary is 100% of the maximum amperage the secondary is designed to continuously carry.

In one mode of operating the latter transformer, one or more legs may be put on standby as they come off charge or discharge and held in that condition for an appropriate number of switching intervals, according to the load, before being passed on to discharge or charge. (At full load, each leg will usually be switched to charge or discharge, without delay, as it is taken off discharge or charge and no legs will be on standby).

In a preferred embodiment of the transformer, each long leg is a primary leg in a step-down transformer and additionally comprises from one to several more (than N) modules which, at full load, are connected in parallel with one or more of the series connected modules (preferably at the low voltage end of the leg). At values of L less than 1, the extra modules are connected in any appropriate series/parallel arrangement in order to reduce the leg current as required and to counter the effect of the consequently lower IR loss in the supply line on $E_p$, the voltage across the primary terminals. That is, N is increased and I $((=E_p-NE_{oc}) \div NR_B)$ is decreased even though $E_p$ (=Power house voltage−supply line loss) rises. ($E_{oc}$ and $R_B$ are the open circuit voltage and resistance of one battery.) Preferably, the number of extra modules is such that $NE_{oc}$ is greater than the power house voltage, thereby facilitating disconnection of the transformer from the supply lines.

For the latter purposes, the control means must also be able to determine in what series and/or parallel arrangement the additional modules should be connected and what the standby interval—if any—should be, according to the current load on the secondary.

In a different aspect, the invention is a D.C. transformer as above defined, connected between a power supply and a power consuming load, in a single or multiple terminal D.C. power distribution system.

Preferably, in all aspects of the invention, said batteries are assembled from appropriately insulated, high temperature, alkali metal/sulfur cells in which the electrolyte/separator is a plurality of fine, cation-permeable, hollow fibers. Battery cells of the latter type are disclosed in U.S. Pat. No. 3,476,602, 3,663,294, 3,672,995, 3,679,480, 3,703,412, 3,791,868, 3,829,331 and 3,917,490.

SUMMARY DESCRIPTION OF THE DRAWINGS

Figure 1:
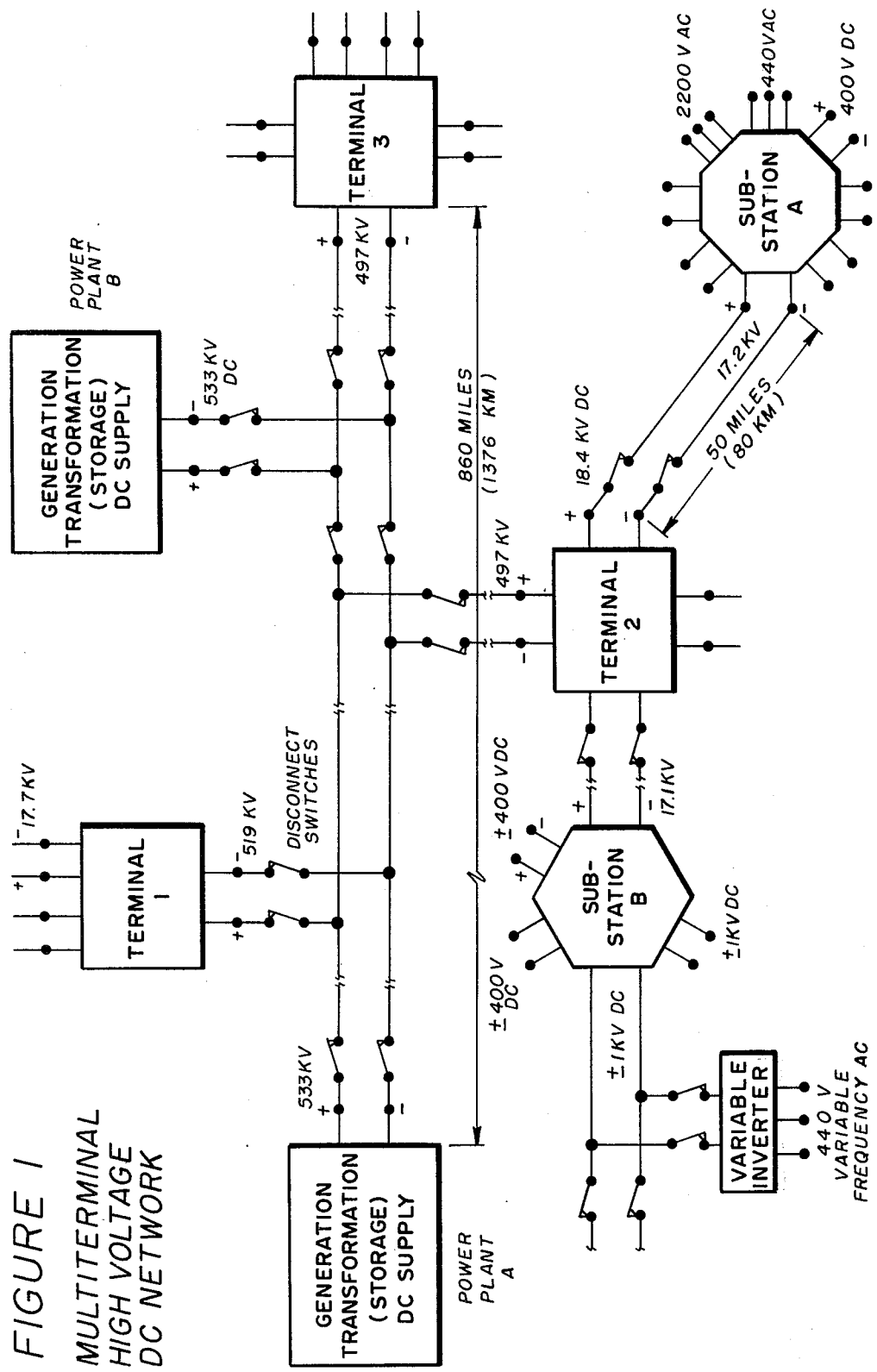
FIG. 1 is a diagrammatic plan view of a multiterminal, bipolar, high voltage D.C. power network, including local sub-stations (only two diagrammed). The terminals and substations shown consist essentially of battery-type D.C. transformers made up of repeatable modules.
Figure 2:
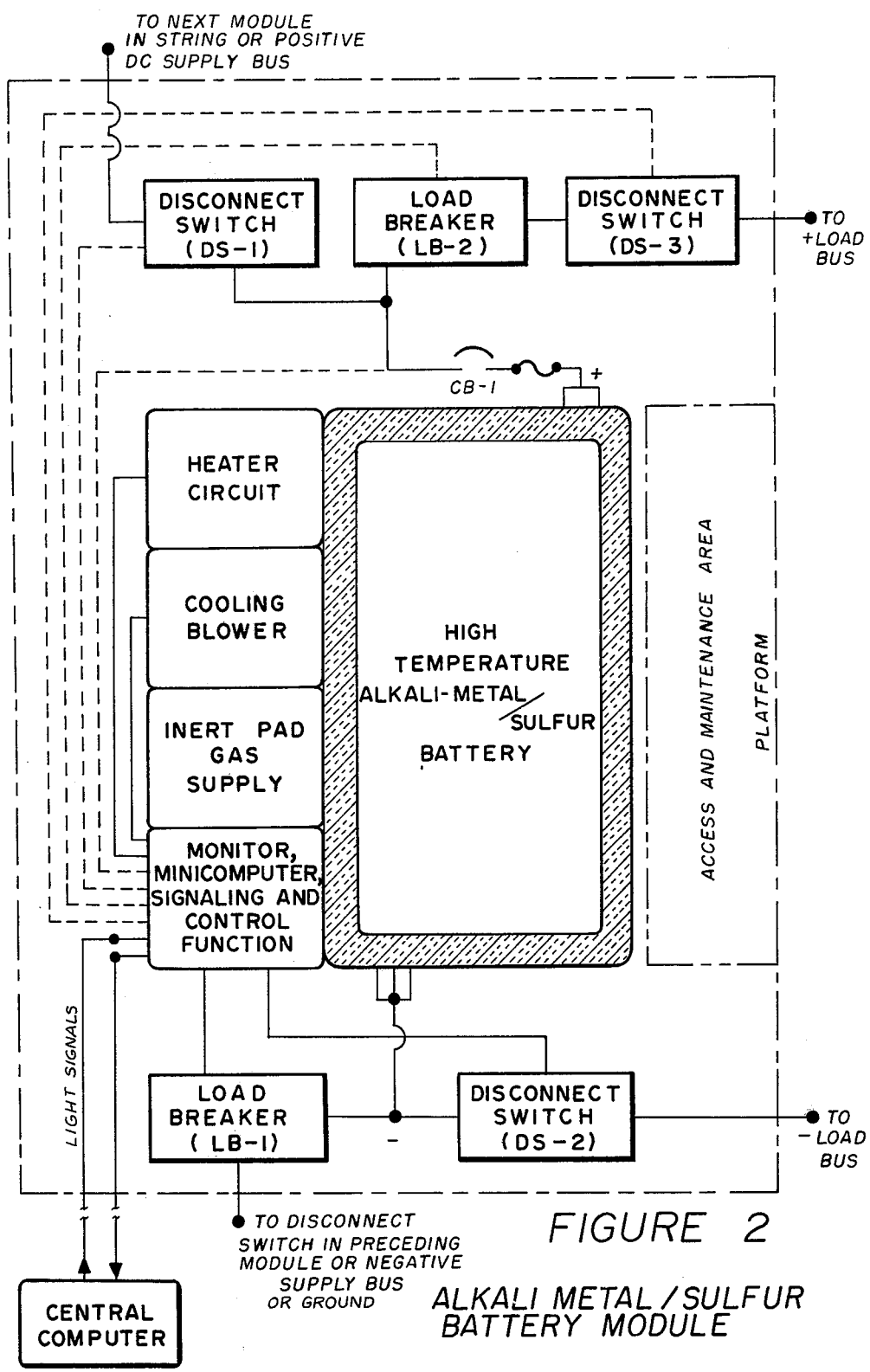
FIG. 2 is a general representation, in plan view, of a module of the latter type comprising a high temperature alkali metal sulfur battery, mounted together with control, switching and auxiliary components on a platform (indicated in phantom) and connected, for step-down or step-up operation, to other such modules (not shown).
Figure 3:
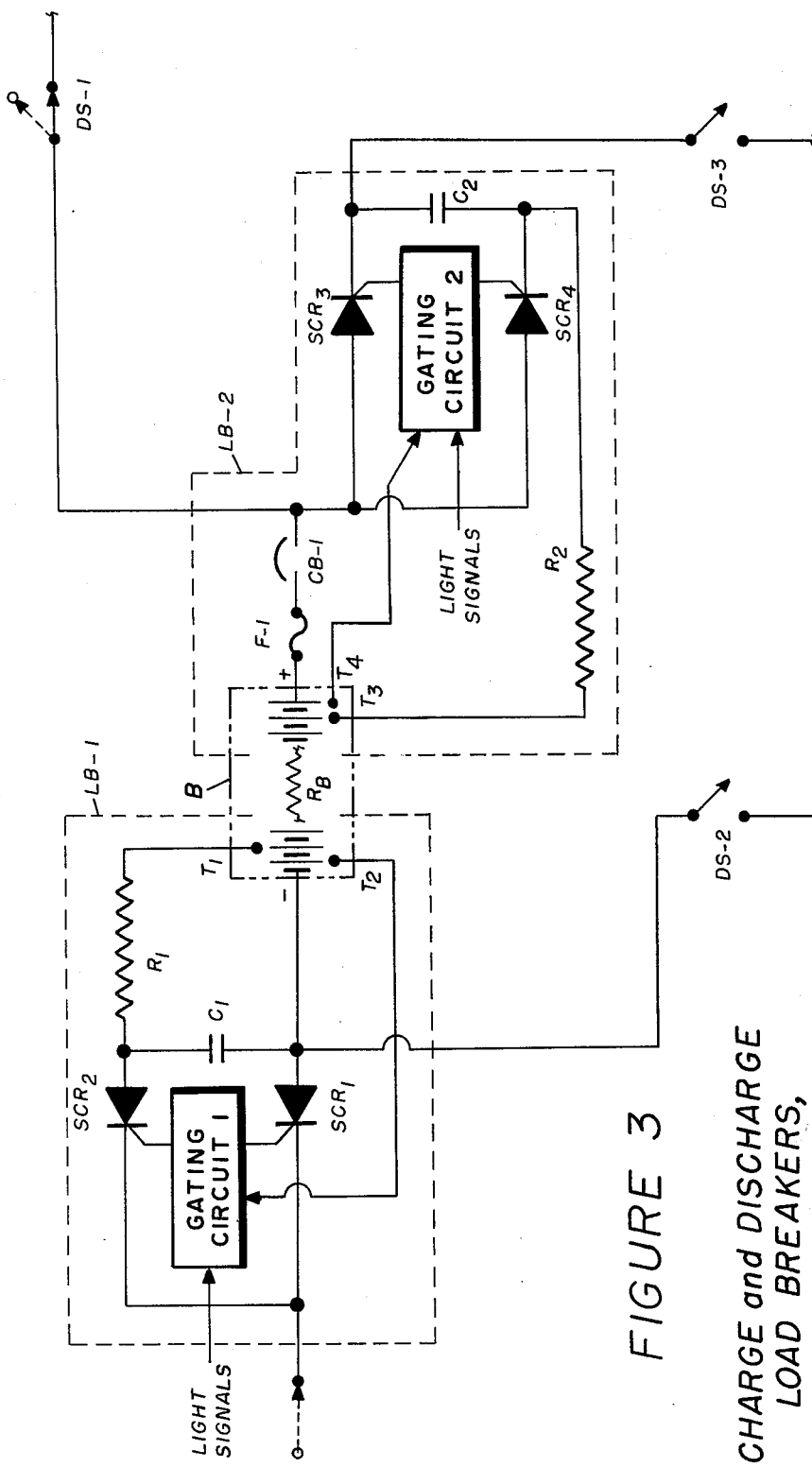

FIG. 3 is a circuit diagram for LB-1 and LB-2, the charge and discharge load breakers in FIG. 2, including the battery with which they are associated and voltage taps thereon. The circuit for each breaker includes a conventional gating function (activated by light signals in a known manner), two paralleled SCR's, a reverse biasing capacitor and a current-limiting resistor. As depicted in FIG. 3, the battery associated with the load breakers has an internal resistance represented by a resistor $R_B$ and is connected (by means of switch(es) DS-1 to operate on charge. (DS-2 and DS-3, the other disconnects, are open). The battery (B) is protected by a circuit breaker (CB-1) and by fuse links (represented as a single fuse means, F-1) connected in series, 1 to 1, to the cells within the battery. Each cell unit is also provided with an automatic by-pass (not shown; see FIG. 11) which operates to maintain the series circuit through the battery if the unit develops a high enough resistance to be essentially non-functional.

Figure 4:
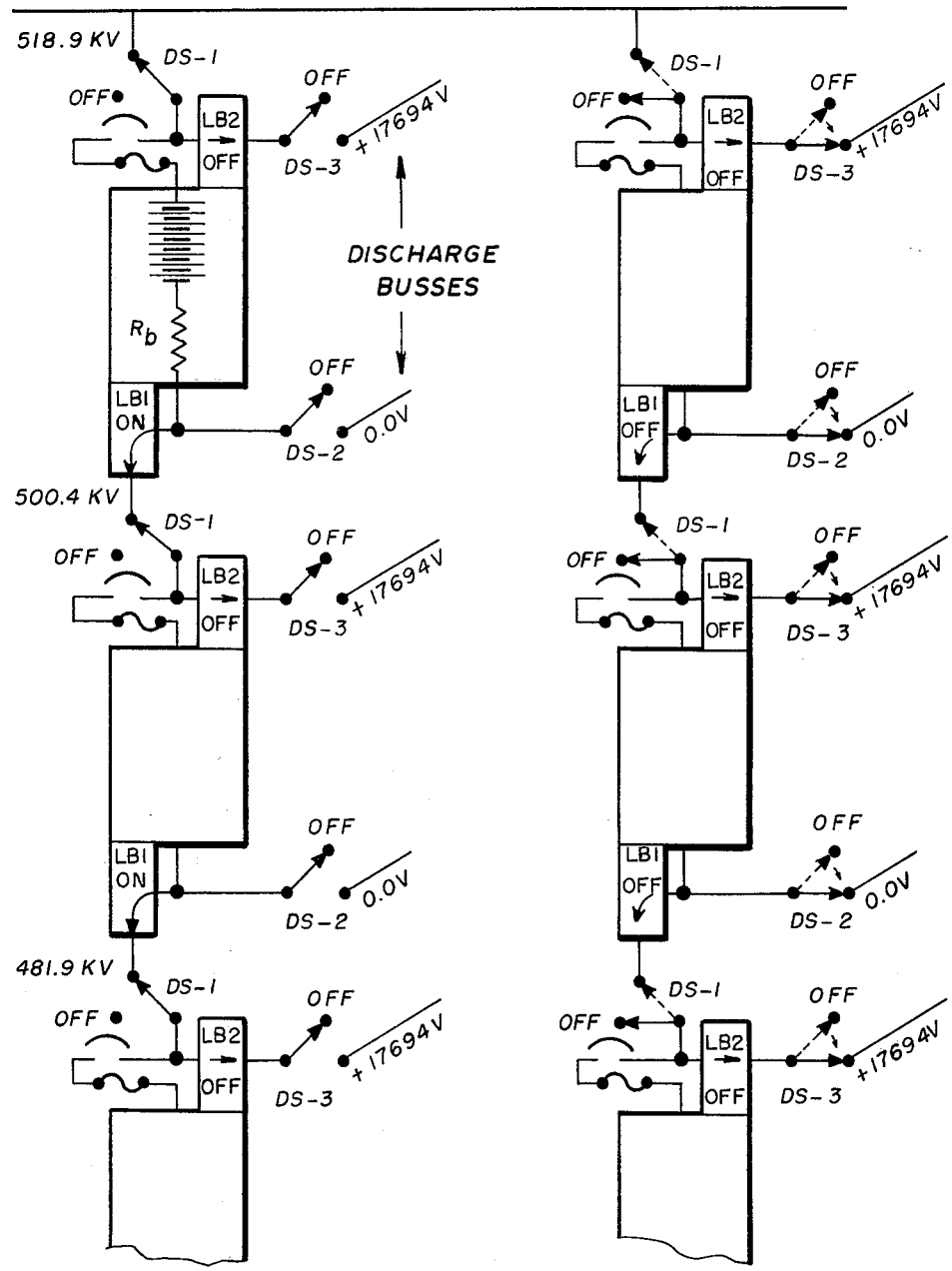

FIG. 4 is a partial schematic for two of the battery (module) strings in a D.C. step-down transformer formed by connecting together modules (of the type shown in FIG. 2) in each of which the switching means comprise a total of three connect/disconnect switches and two, alternately operated SCR load breakers (LB-1 and LB-2; FIG. 3). The batteries in one string (N=26 batteries, for example) are connected in series to form one of the primary legs connected across the power supply terminals of the transformer. The batteries in this string are at full charge open circuit potential and are ready to be switched into the secondary, i.e., put on discharge. The batteries in the other "string" have just been switched to discharge and are connected in parallel with each other, and with the batteries constituting the rest (not shown) of the secondary strings, across the discharge load.

Figure 5:
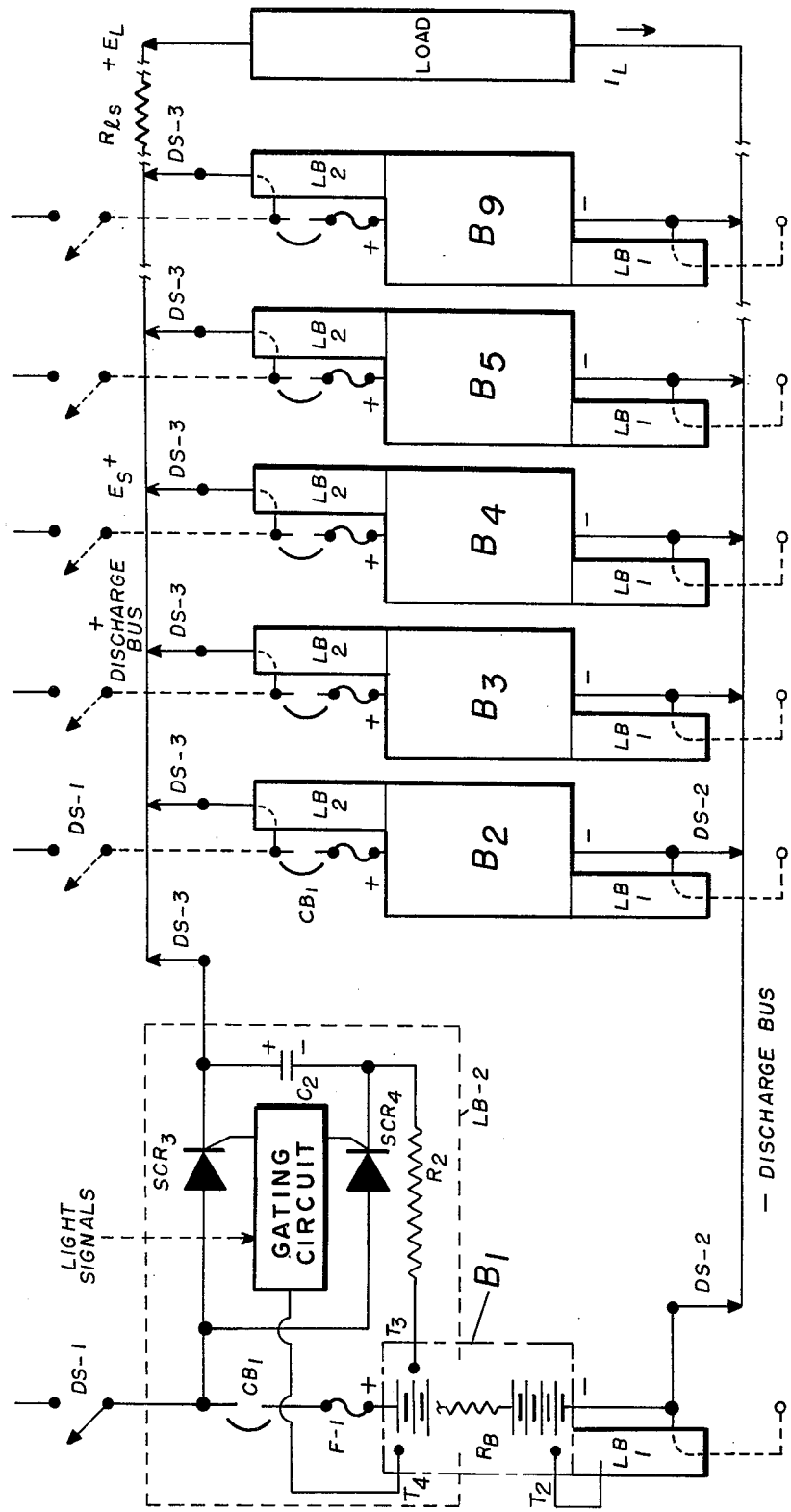

FIG. 5 is a partial schematic for a row of nine discharging batteries connected in parallel, each battery in succession along the row belonging to a string (as in FIG. 4) which, from left to right, is progressively further discharged. The detailed discharge load breaker schematic is shown only for the LB-2 associated with the first (most highly charged) battery in the row.

Figure 6:
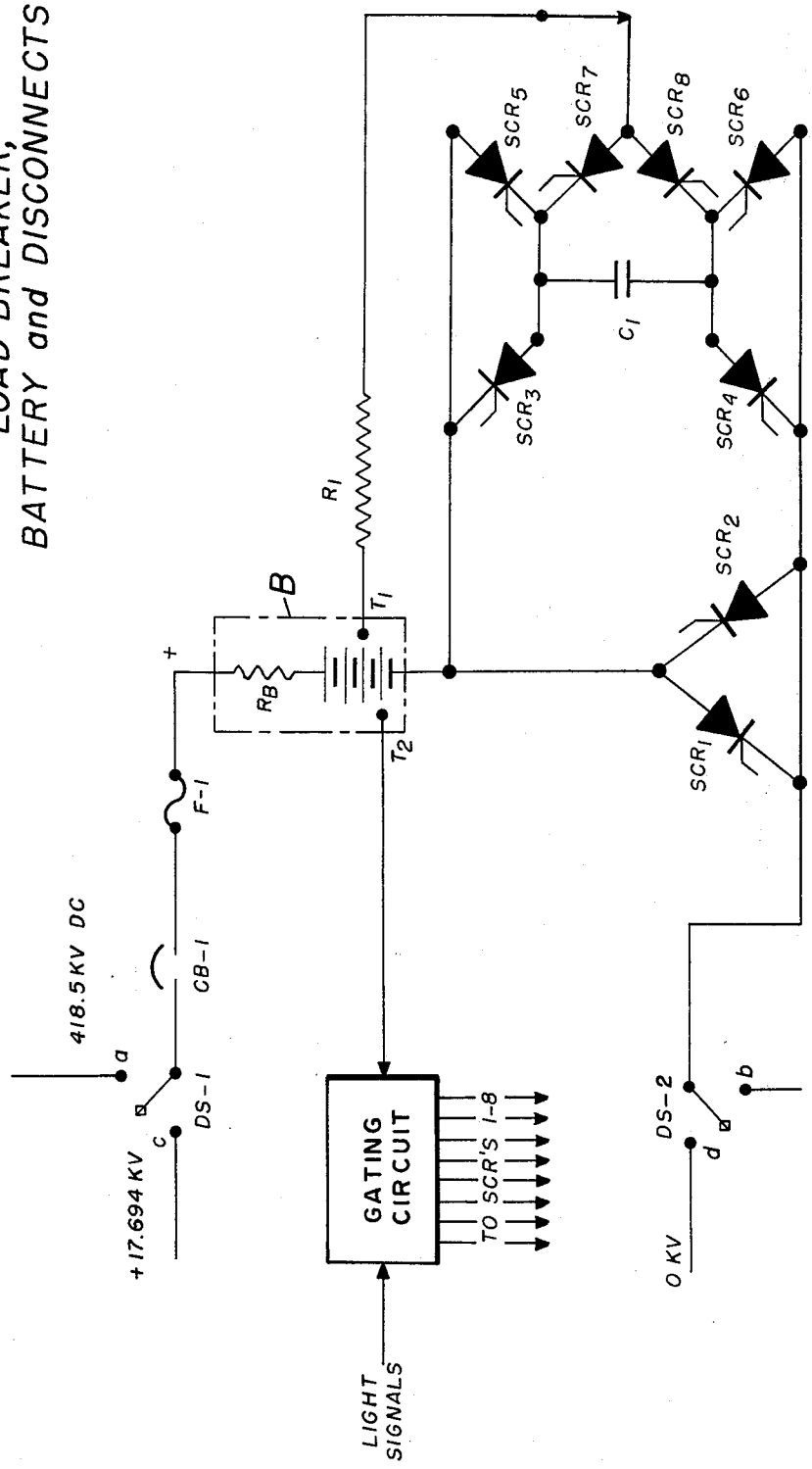

FIG. 6 is a circuit diagram for an alternative, novel and preferred, bimodal load breaker utilizing either SCR's, a single capacitor and a current limiting resistor, which, in combination with a conventional gating circuit and two disconnect switches, acts to interrupt either a charge or discharge circuit through the associated battery. (Again, the battery is protected by a circuit breaker (CB-1) and internal fusing (F-1).

In the bimodal load breaker, only two (double throw) disconnect switches per module are required. Even though twice as many SCR's are used per battery, the extra ones do not have to be heavy duty thyristors and the total number per string is still considerably lower than is required for conventional D.C. terminal installations operating at the same voltage. Furthermore, the savings achieved by using only one capacitor (instead of 2) per battery are quite substantial. Another advantage of this bimodal breaker design is discussed subsequently herein.

Figure 7:
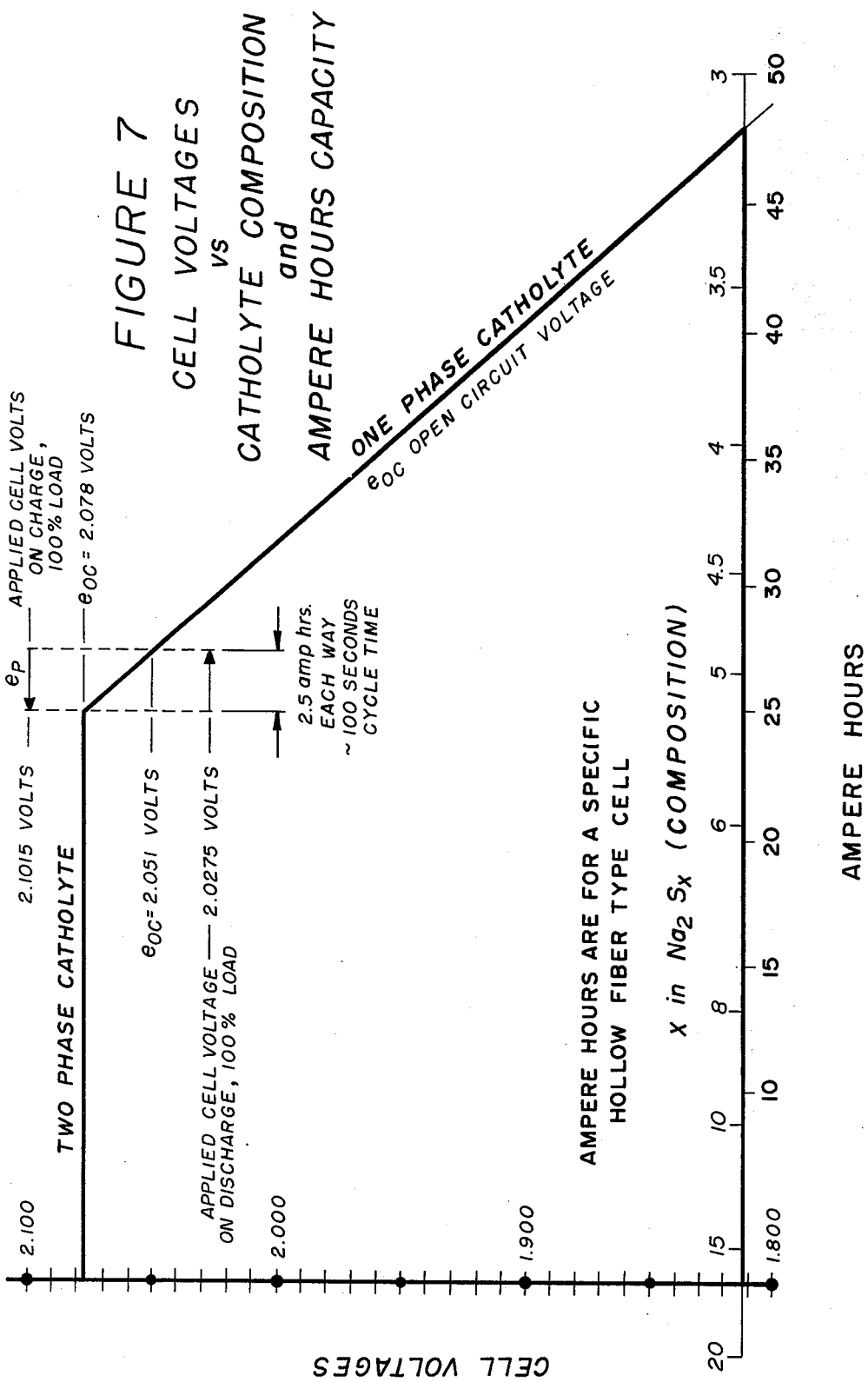

FIG. 7 is a graph of cell voltages versus catholyte composition and ampere-hours capacity for a preferred type of sodium/sulfur cell (specified in detail hereinafter) and shows how the slope of the "operating line" alters abruptly at the point of transition between a single phase and two-phase catholyte.

Figure 8:
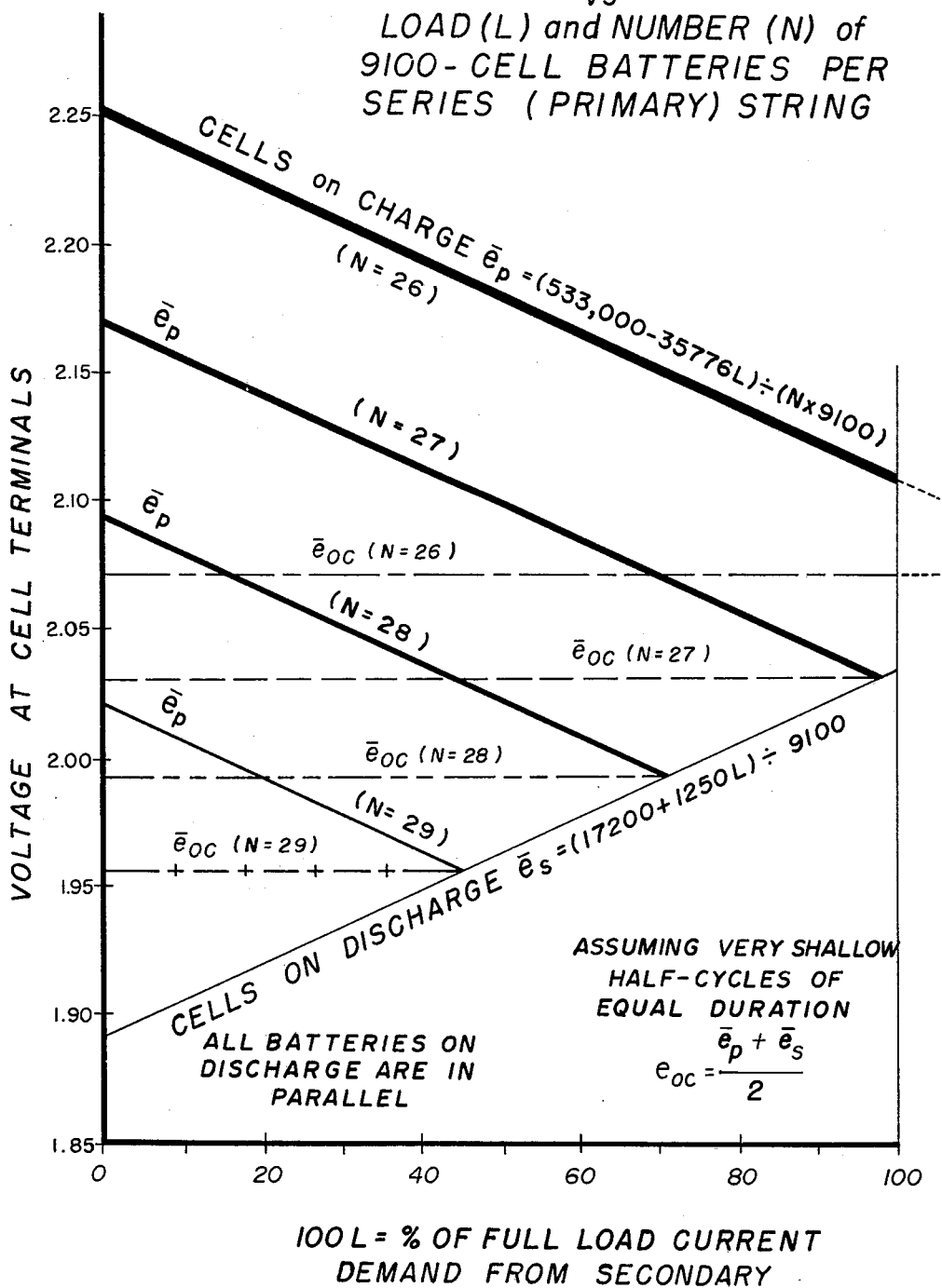

FIG. 8 is a graph of open and closed circuit cell voltages for primary (series) and secondary (parallel) strings of N batteries each, versus the % of full load current in the secondary; an essentially constant $e_{oc}$ (very shallow half-cycles) is assumed.

Figure 9:
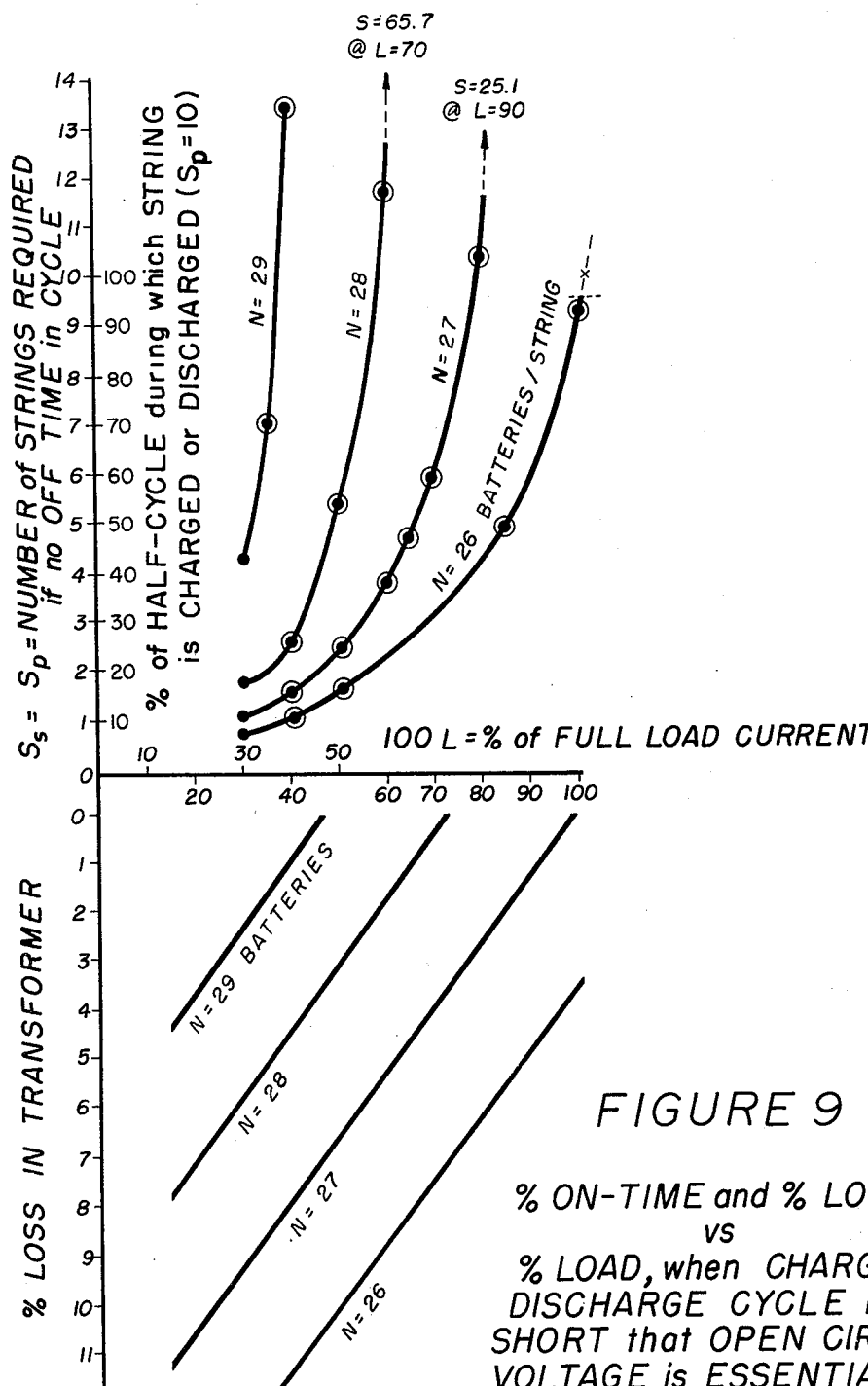

FIG. 9 is a graph showing the interrelationship between load, losses, the number of batteries per string (leg) and the proportion of the half cycle times during which each leg is held on standby. The preferred methods of voltage regulation described herein are explained on the basis of this relationship.

Figure 10:
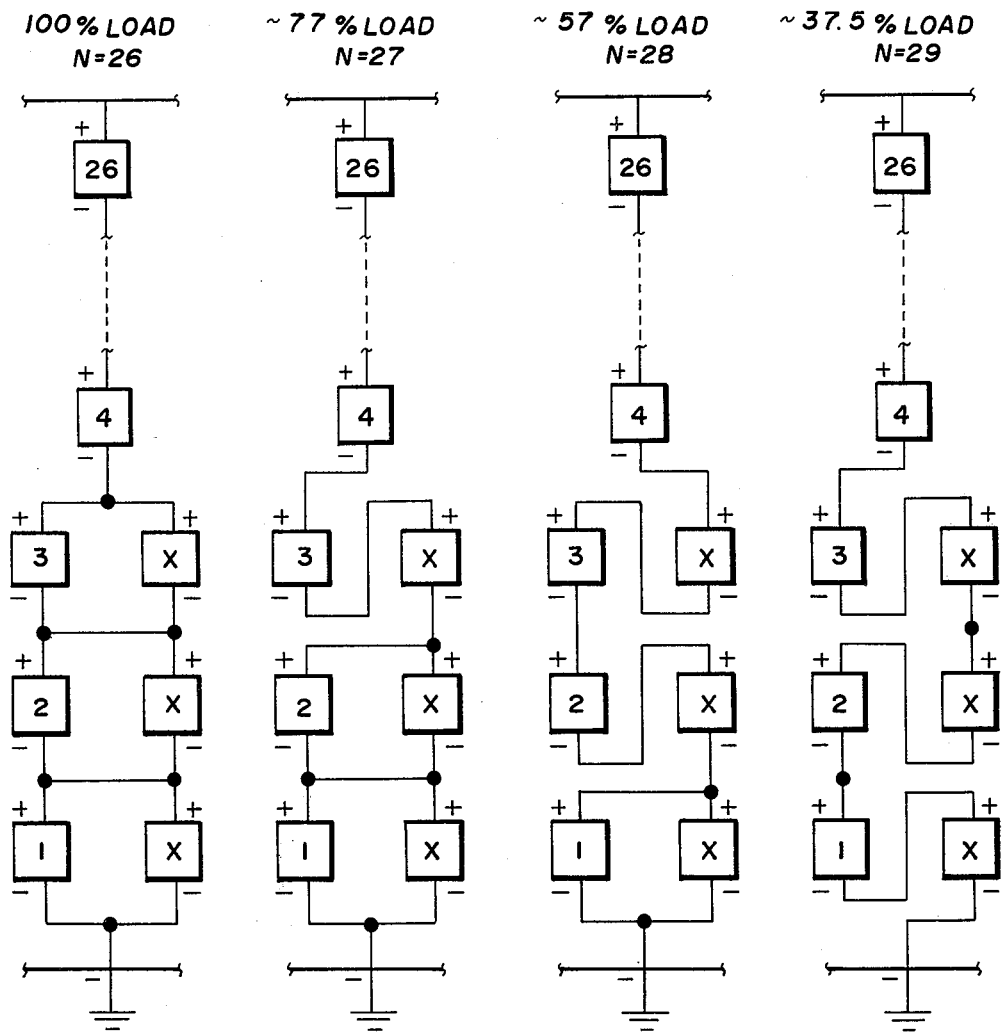

FIG. 10 is a partial schematic showing how the connections between several "extra" batteries and a corresponding number of batteries in a string may be altered as the string is put on charge under successively lower or higher load conditions, for purposes of voltage regulation.

FIG. 11 is an approximately full-scale, elevational, side view of a novel by-pass device which acts to establish a shunt around the cell unit it is associated with when the resistance through the unit rises to such an extent that the unit exhibits an excessive load voltage or becomes essentially non-conductive. The load voltage is applied to a nichrome heating coil which in turn causes a body of mercury to expand and rupture the ampoule it is contained in, after which the mercury drops into a gap between two lead wire ends, thereby completing the shunt circuit. FIG. 11-A is a vertical cross-section of the device in plane A—A, FIG. 11. FIG. 11-B is a horizontal cross-section of the assembly of elements 1,3 and 23-5 in FIG. 11, (in plane B—B, FIG. 11-A), seen from below.

DETAILED DESCRIPTION

It is essential to realizing the advantages of the present invention to employ batteries having a low internal resistance. This is for reasons which include but go beyond the long recognized desirability of minimizing internal power losses in all kinds of electrical devices (which is particularly important for the present application, wherein the batteries are operated continuously, often at full load, rather than intermittently). That is, the magnitude of the voltage at which the current through a string of batteries on charge must be interrupted (to accomplish the requisite, frequent switching) is directly proportional to the internal resistance of the batteries.

That this is so is evident from the following considerations. The number of SCR's which must be used in order to break a D.C. load is reduced if the circuit includes a source of back emf. That is, it is the net, or effective, voltage across the load breaker that determines the load breaker requirements. When a charging potential is applied across a string of batteries, the effective potential is the difference between the applied potential and the sum of the opposed open circuit voltages (the back emf) of the batteries. For a string of N identical batteries, this difference is equal to $NR_BI$, where $R_B$ is the internal resistance of each battery and I is the charging current. Thus, at any given charging rate (current), the effective voltage across the string is directly proportional to the magnitude of $R_B$.

In a lone battery discharging directly through a resistive load, there is no source of back emf in the circuit and the effective voltage is the same as the voltage drop across the load. However, when the battery to be disconnected is only one of a set of (y) batteries connected in parallel across a discharge load, the voltage the load breaker must work against is not simply the voltage drop across the load but is the difference between the average open circuit voltage of the connected legs and the latter drop. That is, the voltage across the opened connection will be equal to $E_{oc}-E_L$, where $E_L$ is the voltage drop across the discharge load and is equal to $\bar{E}_{oc}-R_BI/(y-1)$, I being the current through the load after the connection has been broken. Thus, the voltage the breaker must work against is merely $E_{oc}-(E_{oc}-R_BI/(y-1))=R_BI/(y-1)$. Again, the open circuit voltage has the effect of a back emf and the apparent voltage across the breaker is equal to the internal loss within one "leg" of the circuit. It is then evident that the load breaking requirements for switching in both the primary and secondary are proportional to the internal resistances of the batteries used (and are greatly reduced in both circuits by the "back" emf of those batteries).

The internal resistance of a battery subjected to charge/discharge cycles has a double effect on the electrical efficiency of the battery. That is, every watt hour of electricity charged in "through" the internal resistance of the battery must be discharged through that same resistance. Also, the resistance will generally vary with the charge/discharge condition of the battery, i.e., will not be constant throughout the charge/discharge cycle. Thus, the electrical cycle efficiency (watt hours recovered/watt hours charged) of the battery is a more directly meaningful criterion (than internal resistance per se) of suitability for the practice of the present invention.

However, even a battery having a 100% electrical efficiency would not be used if it cost too much. It is possible to reduce the internal resistance (and thereby the power loss) of a battery by increasing its size in proportion to the watt hours of energy it must handle; but this increases capital costs. According to a rule of thumb attributed to Lord Kelvin, a balance point is reached when the annual capital charges (maintenance+depreciation) are about equal to the annual cost for power losses. That is, the additional cost of further reducing the internal resistance will generally exceed the value of the resulting increase in power savings, once the latter point is passed.

Thus, to be suitable for the practice of the invention, a battery not only should exhibit a high electrical efficiency while being cycled at a substantial wattage rate but should accomplish this with a relatively low content of electrochemically reactive materials and, of course, the battery should be able to maintain its efficiency over a prolonged period of charge/discharge operation.

It is not necessary to subject an array of batteries to "deep" charge/discharge cycles in order to utilize them in a D.C. transformer. Frequent, shallow cyles are in fact preferable, since this minimizes the difference in potential between batteries (or battery strings) being added to and removed from the primary (or secondary), facilitates voltage regulation and is less likely to result in the catholyte or anolyte passing through phase changes. Thus, batteries with a relatively low watt hour capacity can be employed in a D.C. transformer.

However, it is highly desirable that the batteries in (the primary of) a D.C. transformer have at least sufficient capacity to absorb the magnetic energy released by (the inductance of) the lines supplying the primary circuit when the power supply is interrupted. (This is accomplished by sequentially disconnecting the battery strings of the primary and is discussed subsequently herein). It also is highly advantageous if the transformer batteries have sufficient reserve capacity to store such amounts of power as may be required to continue operation of the primary (or secondary) while the secondary (or primary) is shut down (as for system maintenance procedures or fault corrections).

It is of further advantage to be able to utilize the transformer batteries—at least to a limited extent—for storage of off-peak power. It is of course perfectly feasible to employ large enough batteries (cell units) in the transformer to handle all off-peak storage. Further, although the additional capacity required to store larger amounts of energy can satisfactorily be provided by batteries which are generally not efficient enough to be used for D.C. transformation, it is most economical to design the cells to satisfy both functions.

The foregoing essential requirements can be met by any otherwise suitable battery which is made up of series-connected, rechargeable cell units (as defined earlier herein) and is capable of maintaining an electrical efficiency of about 95% or more while being continuously cycled for a period of at least 1000 hours, from the open circuit voltage it has when fully charged to a lesser open circuit voltage and back, at an average rate of at least 80 watts per pound of electrochemically reactive materials contained in said cell units. This efficiency requirement of course does not imply that the losses in the transformer must at all times be 5% or less; it may be preferable to operate, over sustained intervals, at higher loss levels, in some situations—such as when relatively rapid load fluctuations occur. However, an annual average loss of 5% or less will usually be essential to economic operation on a large scale.

(It should be noted that a distinction is to be made between a fully charged cell and a cell having the open circuit voltage it exhibits when fully charged. This is for the reason that in at least one type of cell (sodium/sulfur cells), charging beyond a certain point results in phase separation in the catholyte and uptake of electrical energy without a further rise in open circuit voltage. Thus, the cell may exhibit full charge open circuit voltage even though not fully charged. See FIG. 7).

Batteries meeting the above essential requirements can also have sufficient watt hours capacity to effectively function for inductive energy absorption, reserve capacity and limited peak-shaving.

In one aspect, the present invention is a technical solution to an economic problem. Thus, a key consideration is that cost calculations have indicated that the advantages of HVDC, multiterminal power systems based on battery-type D.C. transformers cannot economically be realized with batteries unable to meet the foregoing specifications.

A particularly suitable battery for the practice of the present invention is made up of high temperature, sodium/sulfur cells in which the electrolyte takes the form of a large number of hairlike, glass or ceramic, hollow fibers, the walls of which are selectively permeable to $Na^+$ ions.

The fibers in each cell are closely spaced in parallel, vertical array and have lower, closed-ended portions which depend from a disc-shaped, ceramic or glass, horizontal "tubesheet" body and are immersed in a molten sodium sulfide/sulfur catholyte contained in a metallic cup, the rim of which is sealingly engaged with the lower periphery of the tubesheet. A hollow metallic rod extends up from the cup bottom along the central axis of the fiber bundle and is connected along its length to the inner vertical edge of a perforated metallic foil which is disposed like a rolled up rug between the fiber layers and serves as a cathodic current collector. The foil roll extends from just under the tubesheet to a distance below the closed fiber ends slightly greater than the width of a metallic spacer tape disposed between the bottom portions of the foil wraps, the lower edges of the tape and foil being flush.

The upper ends of the fibers pass through and in sealing engagement with the tubesheet and open into an anolyte reservoir formed by an inverted cup sealingly engaged at its rim with the upper peripheral portion of the tubesheet. A metallic rod, which functions as an anodic current collector, passes through and is joined to the top of the anode cup and extends into a body of molten sodium occupying the fiber interiors and a portion of the anolyte reservoir space above them.

The assembly is disposed in a surrounding metal casing. The cathodic current collector extends through the casing bottom, to which it is sealed by welding, and is connected to a cathode lead. The upper end of the anodic current collector extends through an insulating seal in the casing top—which is spaced from the anolyte cup—and is connected to an anode lead.

The anodic current collector includes a passageway used to introduce the sodium to the cell (and then closed). Similarly, the hollow cathodic current collector is used to introduce the catholyte and then closed.

Cells of the preceding type—which may be fabricated by procedures disclosed in U.S. Pat. No. 3,791,868 and 3,917,490 (and others of those listed earlier herein)—generally operate at temperatures in the vicinity of 300° C. When a cell is discharging through an external working circuit, elemental sodium gives up electrons to the anodic collector and forms $Na^+$ ions which pass through the fiber walls into the catholyte. Sulfur in the catholyte takes up electrons at the cathodic current collector to form one sulfide ($S^{2-}$) ion for every two $Na^+$ ions formed. Thus, the ratio of sodium sulfide(s) to sulfur in the catholyte increases as discharge proceeds.

Reference to FIG. 7 will be helpful in following the discussion below.

Sulfur is non-conductor but can dissolve limited amounts of sodium polysulfide. Thus, discharge can be initiated if the catholyte contains only a small proportion of sodium sulfide(s), even though the electrical resistance through the cell will be relatively high. In general, however, operation of the cell with a catholyte having an overall sulfur to sodium atomic ratio of more than about 20/2 is not contemplated for the practice of the present invention. Operation below an S/Na ratio of 13/2 is preferred.

At S/Na ratios greater than 5.22/2, the catholyte is not homogeneous (at 300° C.) and consists of two different liquid phases: one phase is a solution of a little sodium polysulfide in sulfur and the other has the composition $Na_2S_{5.2}$. These phases change only in relative amount, not in composition, as the sulfur to sodium ratio is increased (by charging) above 5.22/2, and the open circuit voltage of the cell—which depends on catholyte composition—remains essentially constant (at ~2.078 volts) up to an S/Na ratio of about 15/2. Above this point, further charging results in a much more rapid increase in internal resistance.

At S/Na ratios less than 5.22/2, i.e., in the single phase region—the internal resistance is very low (for hollow fiber type sodium/sulfur batteries) and the open circuit voltage of the cell decreases essentially linearly as the cell is further discharged (S/Na ratio goes down). However, the melting point of the catholyte also goes up rapidly when the S/Na ratio drops below that for $Na_2S_4$. Thus, discharge to a composition having a lower proportion of S than $Na_2S_3$ (mp~325° C.; open circuit voltage 1.8 volts) is not contemplated.

From the standpoint of maximum electrical cycle efficiency, it is preferable to operate within the range of catholyte composition ranging from about $Na_2S_{3.5}$ to about $Na_2S_5$. The internal resistance in this range is essentially constant at a low level (~$2\times10^{-4}$ ohms/cell, for an efficient cell design) and the corresponding open circuit voltages are 1.888 and 2.062 volts, respectively.

The high suitability of hollow fiber type sodium/sulfur cells for use in a D.C. transformer derives directly from their inherently, very low internal resistance. The hollow fiber electrolyte configuration results in a very thin electrolyte/separator with a very large surface area. Similarly, the particular form of cathodic current collector used results in a very high electrode area and permits close spacing of the fibers—thus minimizing the thickness of catholyte between each fiber and the collector. Thus, when the cell is operated in the single phase region, the continuous cycling under full load required for operation of the transformer can be accomplished at an economic level of efficiency.

The cell resistance is higher in the two-phase region, but not so high as to rule out taking advantage of the constant $e_{oc}$ (open circuit voltage) in this region. For example, when operating the transformer primary while the secondary is out of operation, the primary legs may continue to charge for some time after the two-phase region is entered without rising further in voltage. This facilitates voltage regulation, not only when operation of the secondary is resumed and the "over"-charged batteries are put on discharge, but also in operating the primary during the down-time.

Additionally, batteries charged until onset of high resistance, during periods of lower demand, can be discharged for a substantial period, before dropping in voltage, to help meet peak demands for power. (For this application, storage capacity is more fully utilized, at the expense of operating at a lower electrical efficiency.)

Other types of battery cells may also be used in the practice of the present invention, if adaptable to designs offering high electrical efficiencies. Thus, for example, U.S. Pat. No. 3,743,779 (1973) teaches that lead-acid batteries can be modified to have more than 100 times the current capability of a conventional battery of this type. The lead and lead oxide elements of the battery are made in the form of alternating lead foils and lead oxide impregnated webs which are rolled up, together with intervening paper-like, porous insulating webs, on a mandrel. the resulting jelly-roll configuration is highly volume and weight efficient.

A test carried out on one cell of a typical, group I, 6-volt, SLI, 330 amps cranking-capacity, lead-acid battery showed that the cell should be able to maintain an electrical cycle efficiency of 95% when alternately charged and discharged at a rate of 4 amps. The calculated content of active ingredients (Pb, $PbO_2$ and $H_2SO_4$) for the cell, based on conventional lead-acid battery requirements, was 10.1 lbs. This corresponds to 0.793 watts (at 95% efficiency) per pound of active materials. In the jelly-roll form disclosed in the '779 patent such a cell should have over a hundred (say 101) times as much current capacity, i.e., the cell should then be able to operate with 95% overall efficiency at a rate of $101\times0.793=80.1$ watts/lb. of electrochemically reactive materials. Thus, even batteries of such a non-exotic type as lead-acid batteries may be adapted for the practice of the present invention.

Transformer Cycling, Voltage Control, Shut-down and Start-up

Since each of the latter operations involves switching, by means of load breakers and disconnect/connect switches, the manner in which the battery, SCR and switch assemblies of FIGS. 3-6 function will first be explained. Representative numerical values of voltage are given in the Figures.

SCR's are temperature sensitive and it is thus necessary to utilize insulation and a flow of a coolant (such as air) to prevent overheating of any solid state load breaker operated in close proximity to a high (300° C.) temperature battery module. Ordinarily, each battery or battery module is provided with temperature control means comprising insulation, an electrical heating means and means for passing an (inert) pad gas through the unit to a heat exchanger and back again. Since the foregoing temperature control requirements may be readily met with conventional equipment in a conventional manner, no details of temperature control are shown in the Figures.

In order to interrupt the current through the series string of batteries on charge (FIG. 4) it is necessary to simultaneously operate essentially all of the LB-1 load breakers (shown only in symbolic representation) in the string. The latter (series) breakers are shown in FIGS. 3 and 4 associated one to one with the batteries in the string. However, they could be physically grouped together (in series) between the "bottom" battery in the string and the negative supply bus (or elsewhere in the string). In any case, a sufficient safety margin in the forward blocking voltage of the thyristors (SCR's) is provided to ensure that the charging current will be interrupted, even if one or two of the breakers fail to function.

Turning now to FIG. 3, specifically, the functioning of LB-1 (in conjunction with no-load disconnects) in taking one of a string of ~18 KV batteries off charge, is as follows. An applied charging differential ($E_B = E_p/N$) of 18,500 volts ($=E_{oc}+R_BI=18,291+209$) and a Tap 1 open circuit voltage ($E_{To}$) of +597 volts is assumed. Thyristor $SCR_1$ is conducting ("on") and capacitor $C_1$ has been charged, through the current limiting resistor $R_1$, to a voltage of +604 volts ($E_T$, the closed circuit Tap 1 voltage—i.e., with $E_B$ applied). When $SCR_2$ is gated on (in response to a light signal to the gating circuit—which is of a conventional type), the capacitor reverse biases $SCR_1$, which ceases to conduct and—if it remains reverse-biased to turn-off time (assumed to be 100 microseconds)—regains its forward blocking voltage and stays off. The initial total negative potential driving the discharge of $C_1$ to zero volts is the sum of the charge (604 volts) on $C_1$ and $E_B-E_{oc}$ (209 volts), i.e., $-813$ volts. The size of $C_1$ is such that the time required for it to discharge to 0 volts (through a resistance as low as the battery resistance, ~1.73 ohms for 9100 series connected hollow fiber Na/S cell units) will be at least as great as the $100\mu''$ turn-off time for $SCR_1$. If the resistance of $R_1$ is high enough, $SCR_2$ will go off when $C_1$ has reverse charged (through $SCR_2$) to a potential of $-209$ volts. The current flow through the main circuit then stops and the series disconnect switch(es) DS-1 can be opened. $C_1$ now dicharges (through $R_1$) back to zero volts and recharges to the Tap 1 open circuit voltage, through $R_1$. Of course, if the battery is immediately connected in the secondary, i.e., before $C_1$ has had opportunity to charge, $C_1$ will then charge to an $E_c$ a little below $E_{To}$.

The resistance of $R_1$ should be low enough to ensure that $C_1$ will be restored to its original condition within the shortest time period (say 10 seconds) in which LB-1 foreseeably will have to operate again, i.e., when the battery is put back on charge after being on discharge only a few seconds and then the series circuit through the battery has to be interrupted for some reason. However, the minimum acceptable value for $R_1$, the value at which the current through $SCR_2$ is just less than its minimum holding current, will usually be even lower than the value required for a "turn around" time of about 10 seconds or less.

The time required for $C_1$ to discharge to zero volts depends both on the size (the capacitance C) of the capacitor and on the ratio of $E_T$ to $R_B I$ ($=E_B-E_{oc}$). The magnitude of $E_B-E_{oc}$ depends on the degree to which the battery is charged and is greatest when a "completely" discharged battery has just been switched to charge. A representative value for this differential would be $18500-17867=633$ volts. If $E_{To}$ is set equal to this magnitude, the initial charge on $C_1$ is 655 volts ($E_T$ with $E_B$ impressed) and the total potential driving the discharge is $-(633+655)$ or $-1288$ volts. When $C_1$ has discharged to zero volts, the driving potential is $-633$ volts, i.e., is 49.1% of its initial value, and the elapsed time (100 microseconds) elapsed since discharge was initiated is 0.72 of a universal time constant. The time constant is then $100/0.72=139\mu''$ and the required value of C is $139/R_B$ or $139 \div 1.73 = 80.3\mu F$.

If $E_{To}$ is set (at 966 volts) to give an $E_T$ of 1000 volts, the discharge-driving potential difference is initially 1633 volts, the percent of this potential remaining at $E_c=0$ is $(1633-1000)\times 100 \div 1633 = 38.76\%$, the corresponding fractional time constant is $\sim 0.95$ and $C=100\div(0.95\times 1.73)=\sim 60.9 \mu F$. Thus, the higher the ratio of $E_T$ to $E_B-E_{oc}$, the smaller $C_1$ can be.

However, the amount of energy that must be dissipated as heat when charging or discharging the capacitor through a resistance is equal to the energy ($E_T^2 C/2$) stored in the charged capacitor. In other words, although C goes down when the tap voltage is increased, the net effect is a pronounced increase in the heat load.

Thus, a different balance will be struck between such factors as capacitor costs (which go up rapidly with capacitor size), heat loads, power losses, etc., in selecting the Tap 1 voltage in modules of the invention to be employed in different specific installations. However, as a rule of thumb, the open circuit tap voltage may be set equal to the maximum differential between $E_B$ and $E_{oc}$ contemplated in operation of the transformer.

The maximum size of $R_1$ which will afford a turn-around time of 10 seconds or less can now be estimated. If $C_1$ has a capacitance of 60.9 $\mu F$ and is assumed to charge from $-633$ volts to $+966$ volts (the open circuit tap voltage) in 5 time constants, then 1 time constant$=10/5=2$ seconds. $R_1=2\times 10^6/60.9=328,410$ ohms (ignoring the additional resistance through the cells between B$^-$ and Tap 1). The current through $SCR_2$ (and $R_1$) to Tap 1 is $966/328,410=2.94$ milliamps.

If C is 80.3 $\mu F$ and $E_{To}$ is $+633$ volts, the maximum value of $R_1$ for a 10 second turn-around (i.e., for $C_1$ to charge from $-633$ volts to $+633$ volts) is $2\times 10^6/80.3=249,066$ ohms. The current through $R_1$ while $SCR_2$ is on is equal to $E_T/R=633/249,066=2.5$ milliamps.

The foregoing current levels are well below the holding currents (100–500 ma) for thyristors of the type generally suitable for the present purpose.

The operation of LB-2, the (parallel) discharge load breaker(s) in FIGS. 3–5, is closely similar to the operation of LB-1, discussed above. However, it is necessary to let the capacitor ($C_2$, FIG. 3) discharge (from the reverse voltage it has when $SCR_4$ shuts off) through the discharge load (and $R_2$) to zero volts, before opening the disconnect switches DS-2 and DS-3. The more highly discharged the battery is, the lower will be the reverse voltage (the difference between the sum of the discharge voltages across the load and transmission lines and the open circuit voltage of the battery).

Also, in order to recharge $C_2$ towards its original positive voltage, it is necessary (after DS-2 and DS-3 are opened) to pulse $SCR_3$ on. This can be done before, during or after recharging the battery. If $C_2$ is charged while the battery is "floating" between discharge and charge, $E_c$ will attain a value equal to $E_{oc}-E_{To}$ (at Tap 3) for the discharged battery. If $C_2$ is charged after the battery is recharged, i.e., floating between charge and discharge, $E_c$ will rise to a higher value equal to $E_{oc}-E_{To}$ for the charged battery. If $C_2$ is charged while a charging voltage $E_B$ is impressed on the battery, $E_c$ may attain an even high value ($E_B-E_T=E_B-E_{To}\times E_B/E_o = E_B(1-E_{To}/E_{oc})$).

However, there is little point in letting $E_c$ attain any higher value than the difference which will exist between the discharge and tap 3 voltages when the battery is on discharge. That is, $C_2$ will discharge through $R_{ls}$ and $R_L$ (the line and load resistances) and through $R_B$ and $R_2$, as long as $E_c$ is greater than $E_s-E_T$ (not $E_{To}$).

The maximum difference between $E_c$ and ($E_L-E_T$) will be only about 5 percent of $E_c$. The fraction of a time constant for $E_c$ to equilibrate, i.e., decrease to 95% of its initial value, will then be about 0.06. As is shown below, the time constant for this discharge will be on the order of 20 seconds. Equilibration will then only require about $20\times 0.06=1.2$ seconds. Even in the unlikely event that reverse switching is required before $E_c$ has come to equilibrium, the functioning of the load breaker will not be detrimentally affected.

The LB-2 breaker must be able to handle the voltages and currents involved in switching, not only in the normal case where the battery is substantially discharged, but also in an abnormal situation where the battery is to be taken off discharge, at essentially full charge $E_{oc}$, within a few seconds after being connected in the secondary circuit. The higher switching currents and voltages involved in this situation, as compared to those for batteries at successively lower levels of charge, are illustrated in Table 1 below. The batteries identified in the table as $B_1, B_2, \ldots B_9$, are assumed to be connected as in FIG. 5 (which shows only $B_1-B_5$ and $B_9$).

When switching of any one of the batteries in FIG. 5 is begun, by gating on the $SCR_4$ in the LB-2 breaker circuit for that battery, the charge, $E_c$, on $C_2$ not only turns off $SCR_3$, but also adds to the potential applied across the discharge load. $E_s$ increases to an instantaneous value of $(\Sigma_1^9 E_{oc}+E_c-R_B I_L)\div 9$, $I_L$ being the current through the discharge load at the instant $SCR_4$ comes on. $I_L$ rises slightly but rapidly drops back to its original value as $E_c$ goes to zero.

The current through the battery switched off goes to zero and the current through each of the remaining eight batteries increases by an amount equal to oneeighth of the current which was being provided by the battery switched off. The resulting greater RI loss drops $E_s$ below its original value.

Table I is derived by assuming that for each of the battery/LB-2 combinations in FIG. 5, $E_c = E_s - E_T$. The peak current through capacitor $C_2$ in the corresponding LB-2 circuit is 640 amps when battery 1 (at full charge $E_{oc}$) is switched off and is 393 amps when battery 9 (ready to be put on charge and replaced by a recharged battery) is switched off. A secondary bus voltage ($E_s$) of 17,694 volts is assumed.

(In FIGS. 3 and 5, taps $T_2$ and $T_4$ supply power at an appropriate voltage to the gating circuits in LB-1 and LB-2, respectively.)

which is more than the required turn off time ($100\mu''$) for $SCR_3$.

For switching off battery 9, the potential driving the discharge of $C_2$ has dropped from $171 + 576 = 746$ volts to 171 volts when $E_c$ reaches 0 volts. The remaining driving potential is 23% of the initial potential and 1.5 time constants have elapsed. Thus, it takes $156 \times 1.5 = 234\mu$ seconds for $C_2$ to reach zero volts in this case.

It is apparent from the preceding discussions of the LB-1 and LB-2 breakers that the SCR's employed therein should (for use with ~18 KV batteries) be capable of handling peak forward currents of up to about 700 amperes and peak reverse voltages of up to about

TABLE 1

VOLTAGE AND CURRENT CHANGES UPON TAKING ONE OF NINE BATTERIES OFF DISCHARGE

| | | Battery # | | | | | | | | |
|---|---|---|---|---|---|---|---|---|---|---|
| | | 1 | 2 | 3 | 4 | 5 | 6 | 7 | 8 | 9 |
| A. Condition Just Before $SCR_4$ in an LB-2 is Gated On | | | | | | | | | | |
| $E_{oc}$ | Volts | 18291 | 18238 | 18185 | 18132 | 18079 | 18026 | 17973 | 17920 | 17867 |
| $E_{To}$[1] | " | 17694 | 17643 | 17591 | 17540 | 17489 | 17438 | 17386 | 17335 | 17284 |
| $E_s$ | " | 17694 | 17694 | 17694 | 17694 | 17694 | 17694 | 17694 | 17694 | 17694 |
| $R_B i_B$[2] | " | 595 | 542 | 489 | 436 | 383 | 330 | 277 | 224 | 171 |
| $E_T$[3] | " | 17118.4 | 17118.7 | 17118.0 | 17118.2 | 17118.5 | 17118.8 | 17118.0 | 17118.3 | 17118.6 |
| $E_c$ | " | 576 | 575 | 576 | 576 | 575 | 575 | 576 | 576 | 575 |
| $i_B$ | amps | 344 | 313 | 283 | 252 | 222 | 191 | 160 | 130 | 99 |
| B. Condition Just After the $SCR_4$ Associated with Battery #1 is Gated On | | | | | | | | | | |
| $E_s{}^*$[4] | Volts | 17760 | 17760 | 17760 | 17760 | 17760 | 17760 | 17760 | 17760 | 17760 |
| $R_B i_B{}^*$ | " | 1107[5] | 608 | 555 | 502 | 449 | 396 | 343 | 290 | 237 |
| $i_B{}^*$ | amps | 640 | 352 | 321 | 290 | 260 | 229 | 198 | 168 | 137 |
| C. Condition After the $SCR_4$ Goes Off | | | | | | | | | | |
| $i_B{}^{**}$ | Amps | 0 | 395[6] | 364 | 333 | 303 | 272 | 241 | 211 | 180 |
| $R_B i_B{}^{**}$ | Volts | 0 | 682 | 629 | 576 | 524 | 470 | 417 | 365 | 311 |
| $E_s{}^{**}$ | " | 0 | 17556 | 17556 | 17556 | 17556 | 17556 | 17556 | 17556 | 17556 |
| D. Condition B if $SCR_4$ Gated On Is Associated With Battery 9, Rather Than With Battery 1 | | | | | | | | | | |
| $E_s{}^*$ | Volts | 17760 | 17760 | 17760 | 17760 | 17760 | 17760 | 17760 | 17760 | 17760 |
| $R_B i_B{}^*$ | " | 529 | 476 | 423 | 370 | 317 | 264 | 211 | 158 | 680 |
| $i_B{}^*$ | Amps | 306 | 275 | 245 | 214 | 183 | 153 | 122 | 91 | 393 |
| E. Condition C if $SCR_4$ Which Was Gated On Is Associated With $B_9$. | | | | | | | | | | |
| $i_B{}^{**}$ | Amps | 356 | 325 | 295 | 264 | 234 | 203 | 172 | 142 | 0 |
| $R_B i_B{}^{**}$ | Volts | 616 | 562 | 510 | 456 | 405 | 351 | 297 | 246 | 0 |
| $E_s{}^{**}$ | | 17675 | 17675 | 17675 | 17675 | 17675 | 17675 | 17675 | 17675 | 17675 |

NOTES:
[1] Open circuit voltage at Tap 3.
[2] $R_B i_B = E_{oc} - E_B$ and $E_B = E_L + \Delta V$ across $SCR_3$. (~2 volts assumed). $R_B = 1.729\Omega$.
[3] $E_T = E_{To} \times E_B/E_{oc}$.
[4] $E_s{}^* = (E_{c1} + \Sigma_1{}^9 E_{oc} - R_B \Sigma_1{}^9 i_B{}^*) \div 9$.
[5] $E_{oc} + E_{c1} - (E_L{}^* + (\Delta V$ across $SCR_4 = -2V))$. All other $R_B i_B{}^*$ values $= E_{oc} - (E_B + 2)$.
[6] $i_B{}^{**} = i_B{}^* + i_{B1}/8$.
[7] $E_s{}^{} = E_{oc} - R_B i_B{}^{}$.

The time constant for the discharge of $C_2$ from $E_c$ to zero volts, "through" $B_1$ and the rest of the discharge circuit—including batteries 2–8 and $R_s$ (the load and line resistance) but disregarding the capacitance of the latter elements—is $$\gamma = RC = [R_B + (\frac{R_B}{8} \cdot R_s) \div (R_s + R_B/8)] C.$$

If $R_B$ is 1.729 ohms, $R_s = E_s/\Sigma i_B = (17,694/1994) = 8.87$ ohms and $C = 80.3 \mu F$ (see discussion of LB-1 above), $\gamma = 1.94 \times 80.3 \times 10^{-6} = 156$ microseconds.

The total potential driving the discharge of $C_2$ has dropped from $(E_{oc} - (E_s + 2) + E_c$ to $E_{oc} - (E_s + 2)$, i.e., from $(18,291 - 17,696) + 576 = 1171$ volts to $18,291 - 17,696 = 595$ volts, when $E_{oc}$ reaches 0 volts. The remaining potential is then $595 \times 100/1171 = 50.8\%$ of the initial potential and this requires slightly less than 0.7 of a time constant, or about $0.7 \times 156 = 109.2\mu''$, 1200 volts. They should be able to carry D.C. currents of 100–400 amperes (average ~200 amperes) at least half-time and to interrupt such currents at 10 second intervals under potentials of up to about 700 volts. A commercially available thyristor well capable of meeting these requirements is SCR type ATS10FR, listed at line 17, page 142 of the *Thyristor D.A.T.A. Book*, 4th Ed., Spring 1975; D.A.T.A. Inc., 32 Lincoln Ave., Orange, N.J., U.S.A. According to the latter reference, these thyristors are manufactured by CGEE Alsthom, 9 rue Ampere, Massy, France.

The required KVA (kilovolt ampere) rating for each ($C_1$ or $C_2$) capacitor, assuming a capacitance of 100 $\mu F$ and a maximum charge of $E_c = +700$ volts, is 0.75 $CE_c{}^2/2$ or $0.75 \times 100 \times 10^{-6} \times 700 \times 700/2 = 18.4$ KVA.

The combination of an LB-1 and an LB-2 load breaker (as illustrated in FIG. 3) differs in several respects from the bimodal load breaker illustrated in FIG. 6, although the principle of operation is essentially the same in both types. The bimodal breaker employs twice as many thyristors but only half as many biasing capacitors and resistors and requires only two each of battery taps and disconnect switches, rather than three of each.

The bimodal breaker also has the advantage that initiation of switching in one direction, after switching in the opposite direction, does not require first dissipating (as RI loss) the charge left on the biasing capacitor and then recharging the capacitor to the opposite polarity. Instead, the final charge after switching one way can be held on the capacitor and used to initiate switching the other way. Over a period of a month of continuous operation, the ampere hour capacity of the tapped cells (~200–500) of a string coming off charge in a system based on monomodal (LB-1/LB-2) switching will decline (as a consequence of said RI loss) by about 8% and those tapped cells will require the use of auxiliary means to restore their charge. This is not the case when the bimodal breaker is used.

The functioning of the bimodal breakers will now be explained in detail. Referring to FIG. 6, the disconnect switches DS-1 and DS-2 (in each module in the string) are assumed to be closed at points a and b, respectively, so that a charging potential ($E_B$) of 18,500 volts is applied to each battery. Each battery is at an open circuit potential; $E_{oc}$=18,291 volts. The open circuit and closed circuit voltages ($E_{T_o}$ and $E_T$) at each $T_1$ tap are 600 and 607 volts, respectively. The SCR$_1$'s are conducting and the current through the latter thyristors and the batteries is 121 amperes. Each C$_1$ has been charged (through the SCR's 3 and 8, now off) to a potential $E_c$= −607 volts and has a capacitance C=80.3 μF.

Switching from charge to discharge is initiated by gating on the SCR 4 and 5 in each of the (N) load breakers. Each SCR$_1$ is reverse biased by the charge on C$_1$ and turns off. The C$_1$ capacitors discharge to 0 volts and reverse charge, through the SCR's 4 and 5, the batteries and the rest of the primary circuit, to a voltage $E_c$=(18,500−18,291= +209 volts. The discharge from −607 to 0 volts requires at least 194μ″, so SCR$_1$ (turn-off time ~100μ″) stays off. The SCR's 4 and 5 turn off when the capacitors are reverse charged. The current through the string drops to zero from an initial value of 816/1.729=472 amps and each set of DS-1,2 disconnects can now be thrown to the discharge bus contacts c and d. If the SCR$_2$'s are gated on, the string of batteries will discharge through the secondary load.

During discharge, Ec remains at +209 volts, unless SCR's 4 and 7 are gated on, in which case Ec will rise towards a voltage $E_T$=$E_{T_o}$·$E_B$/$E_{oc}$, which is constant (at ~580 V) because neither $E_B$ nor the ratio of $E_{T_o}$ to $E_{oc}$ changes as discharge proceeds.

Switching back to charge from discharge is initiated by gating on the SCR's 3 and 6 (in each module, simultaneously or not). SCR$_2$ turns off, C$_1$ discharges to $E_c$=− zero and reverse charges to $E_c$=−($E_{oc}$−$E_B$) volts or, assuming the batteries have each discharged to an $E_{oc}$ of 17,867 volts, to −(17,867−17,694)= −173 volts. When the condenser is charged, SCR's 3 and 4 turn off and the disconnects can be thrown to connect the batteries in series across the supply voltage. The SCR$_1$'s are gated on and C$_1$ can be charged on up to about +600 volts by gating on SCR's 3 and 8.

If disconnection from the discharging circuit is necessary just after putting a string of batteries on discharge, $E_{oc}$−$E_B$ will be higher (18,291−17,694= +597 volts, for example) and the current will jump from 597/1.729=345.3 amps (through SCR$_2$) to an initial charging rate ("through" C$_1$) of (597+$E_c$)/1.729, or −if $E_c$ is 607 volts −1204/1.729= ~696 amperes.

Of the eight thyristors used in the bimodal breaker, only SCR$_1$ and SCR$_2$ have to carry the charge or discharge current for a full half-cycle. SCR's 7 and 8 are used alternately, with SCR$_4$ or SCR$_3$, respectively, to charge C$_1$, through the current limiting resistor R$_1$, to a voltage $E_c$=$E_T$. This requires about 10 seconds and does not involve currents comparable to those handled by SCR's 1 and 2. SCR's 3 and 4 are also used (alternately and with SCR$_6$ or SCR$_5$, respectively) in discharging C$_1$. This requires only about 100–1000 microseconds per cycle but the peak (initial) currents can be as high as 700 amperes and the corresponding reverse potentials can be greater than 1200 volts.

Thus, SCR's 1, 2 and 3-6 (in FIG. 6) must meet the same performance requirements as SCR's 1,3 and 2,4—respectively—in FIG. 3. However, the requirements for SCR's 7 and 8 (FIG. 6) are substantially lower.

Voltage Control

In order for the secondary of the transformer to function as a useful power supply, the voltage ($E_L$) at the discharge load must not change substantially with load variations. Similarly, the charging potential ($E_B$=$E_p$/N) across each battery in the primary should be held essentially constant, despite variations in the supply voltage resulting from the effects of discharge load changes on supply line losses. Also, it is desirable to be able to accommodate such minor variations in supply voltage as may result from changes in operating conditions elsewhere in a multiterminal system.

In a battery-type D.C. transformer, there is no electrical or magnetic connection between the primary and secondary circuits. This is of distinct advantage in that shut down of one of the circuits (as for maintenance or fault correction) does not require or necessarily result in shut down of the other circuit. That is, the other circuit may continue to operate for a finite time period, the duration of which depends on the reverse charge or discharge capability of the batteries it comprises. It also permits either circuit to process more power than the other, as in peak-shaving, for a limited time. However, the transformer will be operated predominantly in a steady state mode (watt hours in = loss + watt hours out) and this requires separate but coordinated adjustments within the two circuits in response to variations in the current demanded from the secondary.

In making the latter adjustments, several factors will be weighed against each other.

First, to permit flexibility of operation and to keep open as many options as possible, it is desirable to have a sufficient number of fully operable batteries on hand ( and to so program the central computer) that the method of voltage control must appropriate under a given set of conditions can be selected. That is, the operation should be adaptable to as many alternative methods of control as possible.

Second, the longer the switching interval, the less the wear on and power consumption by the switching means. This is particularly true of electro-mechanical disconnect switches.

Third, the inventory of batteries required for the overall operation, including peak shaving, should be minimized, i.e., the degree of utilization of the batteries (for voltage transformation or peak-shaving) should be as high as possible. In other words, as many of the batteries as possible should be in service, rather than "idle", at any given time.

Fourth, the mode of operation utilizing the smallest proportion of the total battery inventory for voltage transformation will provide the most "stand-by" batteries for power storage or supply.

Finally, power losses within the transformer itself should be kept as low as possible.

(Although the discussion of voltage regulation henceforth is in terms of responding to load decreases, opposite changes are of course inferred for load increases.)

If the load resistance increases, the current ($I_s$) demanded by the load drops but the voltage drop across the load ($E_L = R_L \cdot I_s$) will show a net increase unless the voltage ($E_s$) across the secondary terminals as lowered. This can be done either by (A), increasing the internal resistance of the secondary or by (B), reducing the average open circuit voltage ($E_{oc}$) of the secondary "strings" (batteries).

The corresponding changes made in the primary will be of such a nature that (a), the open circuit voltage of each battery coming off charge will not differ greatly from the average open circuit voltage to be maintained in the secondary at the reduced load, and (b) the primary is adjusted either to accept and store the excess power over that required for the secondary load or to present a higher impedance to the supply source.

The variables which can be co-manipulated to effect the necessary changes in the transformer are S, the total number of battery strings therein, the distribution of those strings between the primary and secondary, i.e., $S_p$ vs $S_s$, ($S_p + S_s$ being equal to S), the relative lengths of the charge and discharge half-cycles, the proportions of the half cycles during which each string is on charge or discharge and on "stand-by", and N, the number of batteries per string. Manipulation of these variables in several different ways is illustrated in the following discussion (including Tables 2 and 3 and with reference to FIGS. 7–10). The way in which loss control enters into the choices made is also shown.

In making the analysis of voltage control, several assumptions are made, in order to minimize and/or simplify the discussion. A step-down transformer, in which all of the batteries in the secondary are in parallel and the primary comprises $S_p$ strings of N series-connected batteries each, is assumed. Also, assumed, as an initial set of conditions, are the following specific voltages, currents, S and N values, etc.:

$E_L$, voltage maintained across user load, 17,200 volts;
$I_L$, full load current demand by user(s) 46,800 amps;
$E_{ls}$, voltage drop in 50 mile line to user(s), 1250·L, L being the fractional load ($I_L/46,800$);
$E_s$, voltage across secondary terminals, 17,200+1250·L;
Voltage input to transformer supply line, 533,000 volts;
$I_p$, current demand on power supply under steady state conditions when L=1, 1800 amps;
$E_{lp}$, voltage drop in 860 mile supply line, 35,776L;
$E_p$, voltage across primary terminals, 533,000–35,776L;
N, the number of batteries per primary string, 26;
$S_p$, the number of primary strings, 10;
$S_s$, the number of secondary "strings" (the ratio of the number of batteries in the secondary, to N), 10.

Each of the batteries used is assumed to consist of n= 9100 cell units (cells, in this case) in series, each cell being of the hollow fiber type described earlier herein and meeting the following rather extreme specifications for a cell having a near-minimal capacity for power storage.

Stainless steel casing, 3.6" (9.144 cm) diameter ×4.0" (10.16 cm) high;
Fibers, 2,786,901 in number, 6.0 cm long, 21μ O.D., 15μ I.D., active length, 3.7 cm; spaced ~21μ from each other within generally concentric rows and 3.85μ radially, from intervening carbon-coated aluminum foil wraps (cathodic current collector);
Electrochemically reactive contents, 104 grams sodium and 174 grams sulfur;
Ampere hours capacity from catholyte composition of $Na_2S_{20}$ to $Na_2S_3$, 50 (see FIG. 7);
Watt hours per pound of electrochemically reactive ingredients, ~161. (Watts/lb., 652.)
Internal resistance, $1.9 \times 10^{-4}$ ohms.
Full charge open circuit voltage, 2.078 volts.

At this point, it should be noted that hollow fiber type sodium/sulfur battery cells exhibit virtually 100% coulombic efficiency. That is, essentially all electrons passing into and out of the cell are utilized in or evolved by transformations between $Na^o$ and $Na^+$ or $S^o$ and $S^{2-}$, and no side reactions occur. Consequently, the internal RI loss is entirely a voltage loss and the efficiency of the transformer (watts out/watts in can be expressed simply in terms of the average closed circuit cell voltages, i.e., as $\bar{e}_s/\bar{e}_p$. Accordingly, the analysis of voltage control can be made simply in terms of open and closed circuit cell voltages.

The above assumed initial values of n, N and $S_p$ were arrived at as follows. Assuming that the "maximum" value of $\Delta_s$, the % internal loss in the secondary, occurs when a freshly charged string has just been placed on discharge and that $\Delta_s$ is to be held at 2.5% or less, then the required value of n is found, from the relationship n=(17200+1250)×(1+$\Delta_s$/100)÷2.078, to be 9100.7, i.e., n=~9100. Similarly, if it is assumed that the total loss in the transformer is to be held at or below 4.6%, then $\Delta_p$, the % loss in the primary, is equal to 4.6-$\Delta_s$ and the required value of N is found, from the relationship N=(533,000−35,776)×(1−(4.6−2.5)/100)÷(9100.7-×2.078), to be 25.74, i.e., N=~26.

The number of strings (or batteries) required on either side of the transformer is equal to the ratio of the total ampere hours of capacity to be gained or lost per half-cycle to the change in ampere hours capacity per cell (in a series of 9100×26 cells) during that half-cycle. Thus, the total increase in ampere hours capacity in the primary which must be accomplished in the charging portion of a cycle, at full load, is 1800×$t_c$/60, where $t_c$ is the charging time in minutes. The amp hours per cell per half-cycle can be determined from FIG. 7, once the open circuit voltages between which the cells are to be cycled is known.

The $e_{oc}$ at the conclusion of charging is set at 2.078 volts and $e_p$, the applied volts per cell on charge is (533,000−35776)÷(26×9100)=2.1015 volts. $e_s$, the volts developed per cell on discharge is (17,200+1250)÷9100=2.0275 volts. If the length of the charge and discharge times are assumed to be essentially equal, the $e_{oc}$ at the end of discharging (start of charge) is calculated—as an approximately correct value—as equal to $e_s + (e_p - e_{oc}$ at end of charge), or 2.0275+(2.1015−2.0780)=2.0510 volts. It will be seen from FIG. 7 that the difference between the two open circuit voltages corresponds to a change of 2.5 ampere hours of cell capacity.

$t_c$ (the charge time) is estimated as follows. The average open circuit voltage for the charge half-cycle is calculated to be 2.065 volts and is taken as essentially equal to the open circuit voltage after a 1.25 ampere hour interval in either direction, i.e.,—from start of charge or start of discharge. The amperage rates at charges of 0, 1.25 and 2.5 ampere hours are calculated as $(e_p-e_{oc})$ divided by the cell resistance, or $(2.1015-2.051)/0.00019 = 265.8$ amps, $(2.1015-2.065)/0.00019 = 192.1$ amps and $(2.1015-2.078)/0.00019 = 123.7$ amps respectively. The mean values of the amps for each of the two quarter cycles are then calculated as the log means of the pairs 265.8, 192.1 and 192.1, 123.7 and are 227 and 155.4 amps, respectively. The corresponding quarter cycle times are then $60(2.5/2) \div 227 = 0.3304$ minutes and $60(2.5/2) \div 155.4 = 0.4826$ minutes respectively and the total charge half-cycle time is 0.8130 minutes (or 48.8 seconds). $S_p$, the number of primary strings needed, is then $(1800 \times 0.8130/60) \div 2.5 = 9.76$. The number of secondary "strings" is similarly calculated from $(e_{oc}-e_s)0.00019$ for each of the preceding three $e_{oc}$ values (total discharge half-cycle time 0.8076 minutes or 48.5 seconds) and found to be 9.69 strings (the total number of batteries in the secondary, divided by 26). Thus, $S_p$ and $S_s$ are each assumed to be 10 and $S=20$ strings total.

To facilitate the inquiry from this point on, the simplifying assumption is made that the charge and discharge half-cycles are so short (so "shallow") that the open circuit voltages of the cell units coming off charge and discharge will not differ substantially from the average open circuit cell voltage for the transformer ($\bar{e}_{oc}$) and the latter value can be taken as equal to $(\bar{e}_p+\bar{e}_s) \div 2$, where $\bar{e}_p$ and $\bar{e}_s$ are, respectively, the average closed circuit voltages across the cell units in the primary and secondary.

In FIG. 9 of the drawings, values of $\bar{e}_p$, $\bar{e}_s$ and $\bar{e}_{oc}$ are plotted against the % load (100L) for several different values of N. Some error will result if these plots are applied to transformer operations in which the cycles are deep enough so that $\bar{e}_{oc}$ is not essentially equal to $(\bar{e}_p+\bar{e}_s)/2$. However, the approximation is good enough that the plots may be used to illustrate the principles involved in voltage control and it is well within the skill of the art to derive the more exact relationship on which programming of the computer(s) required to operate a full scale installation with maximum efficiency will be based.

The most direct way of increasing the internal resistance in the secondary, as L goes down, is to reduce the number of batteries in the secondary.

It can be anticipated that a corresponding increase in the internal resistance in the primary will be required and it is apparent that this can be done most simply by reducing $S_p$—the number of primary (parallel) strings. That is, a complete string will be disconnected from the primary when L has decreased a certain amount. Accordingly, disconnection of N secondary batteries per "step", i.e., a "string" at a time is also indicated. In other words, in this method (A-1) of voltage regulation, $S_p$ will be reduced to successively lower, integral, values as L declines. The strings taken off each side of the transformer will be put on standby. This method of voltage control is based on maintaining a "balanced" condition, i.e., $S_p=S_s$ and $I_p=I_s$.

The simplified relationship between S and L (and N) is derived as follows. The average amps of current through each secondary cell is equal to $(\bar{e}_{oc}-\bar{e}_s) \div (R_B/9100)$, where $R_B$ is the internal resistance of each battery or 1.729 ohms. However, since $\bar{e}_{oc}=(\bar{e}_p+\bar{e}_s)/2$, $\bar{e}_{oc}-\bar{e}_s=(\bar{e}_p-\bar{e}_s)/2$ and the amps per secondary cell is also equal to $(\bar{e}_p-\bar{e}_s)9100/3.458$. The amps per cell in the primary are 1800 L/$S_p$, so $1800 L/S_p = (9100/3.458)(\bar{e}_p-\bar{e}_s)$ or $\bar{e}_p-\bar{e}_s = 0.684$ L/$S_p$. $\bar{e}_p$ and $\bar{e}_s$ can be read off from FIG. 8, but $S_p$ can be more accurately found from calculated values of $\bar{e}_p$ and $\bar{e}_s$. Since $\bar{e}_p=(533,000-35,776L) \div (9100N)$ and $\bar{e}_s=(17200+1250L) \div 9100$, substituting and solving for $S_p$ gives:

$S_p = LN \div (85.6307 - 5.7477L - 2.7633N - 0.2008LN)$.

If values are assumed for L and N, corresponding values of $S_p$ can now be calculated. In the upper half of FIG. 9, $S_p$ values so calculated are plotted (left hand vertical scale) against 100L for several values of N. It appears from the plot that 10 strings (of 26 batteries each) will handle more than the design load, i.e., will accommodate over a "100%" load. (This is consistent with the required values of 9.76 and 9.69 for $S_p$ and $S_s$ found above for a 100% load.) However, in actual practice, switching—which has so far been considered instantaneous—will require a finite time and 10 strings will probably be necessary at 100% load.

Another method (A-2) of voltage control under balanced conditions which has the effect of reducing the number of batteries on discharge (and charge) is to place each string, as it comes off discharge or charge, on standby, for from one to several switching intervals, before switching it to charge or discharge. This decreases the number of strings in the transformer which are active at any given time but no string is out of service for more than a portion of a half cycle (now including the standby time). This is more usefully expressed, however, as the percent of the half cycle during which each string is active, $S_p$ remaining constant.

Method A-2 is disadvantageous in that the strings on standby cannot be utilized for peak-shaving, but it has the advantage of permitting the resistance to be increased in smaller increments. That is, adjustments may be made in units as small as a fraction of one switching interval out of the total number of switching intervals per half-cycle, rather than in integral units of an entire string at a time. (Of course, in all cases, the time between successive switchings for a given string must be sufficient for charging or discharging of the capacitors in the switching circuits.)

It should be noted that whenever a battery is to be held on "standby" long enough so that substantial cooling would otherwise occur, a means of heating it ordinarily will be provided in order to keep the temperature of the battery within the desired operating range.

Preferably, adjustments are made in method A-2 in units of a whole switching interval at a time. Thus, for example, if there are 10 strings of N batteries of each side of the transformer and strings are being "exchanged" (one for one) between the primary and secondary at two-second intervals, each half cycle requires 20 seconds (ignoring actual time requirements for the switching operation) and the total cycle time is 40 seconds. If, at a given switch point, the two strings switched off charge and discharge are not put on discharge and charge (respectively) until after a one-second delay, and likewise for the next two, etc., a transition from 100% "on"-time to 95% on-time will be made. Some minor voltage fluctuations will occur on both sides of the transformer before the transition is complete (total cycle time, including the one second delay in each direction, again 40 seconds) and equilibrium is re-established.

From FIG. 9 (right hand vertical scale) it appears that for 10 strings of 26 batteries each, under the above assumed condition, that even 95% on time would be more than is required for a 100% load. However, it is again necessary to make allowance for the fact that each switching operation will require a finite time period.

It will be recognized that both the number of strings and the percent on-time can be manipulated for voltage control. That is, $S_p$ must be reduced in integral steps and this results—particularly at lower loads—in a relatively coarse adjustment. However, the percent on-time can be varied in small increments between successive $S_p$ values. (The 0–100% on-time scale can of course be contracted to extend from 0 to whatever value $S_p$ takes on.)

It was assumed above that the cycle length would be kept so short that the difference between the average $e_{oc}$ values for the primary and secondary would be negligible. It is then of interest to determine how substantial the difference really would be for the 40 second cycle time arrived at in the preceding example. From FIG. 7, it is apparent that the change in open circuit cell voltage, in volts per ampere hour, within the range of catholyte composition extending from $Na_2S_{5.2}$ (25 ampere hours) and $Na_2S_{4.6}$ (30 ampere hours), is $(2.078-2.023) \div (30-25) = 0.011$ volts/amp hr. Assuming operation within this range and an average cell current of about 200 amperes, 20 seconds of discharge, for example, would result in an $\bar{e}_{oc}$ drop of $200 \times (20/3600) \times 0.011 = 0.0122$ volts, or only about $100 \times 0.0122/2.078 = \sim 0.6\%$. Although such a voltage difference (0.0122 volts) is substantially larger in comparison to $e_p - e_s$, i.e., would range from about 10 to 20% of $e_p - e_s$, only the assumed instantaneous $\bar{e}_{oc}$ values on each side of the transformer will be accordingly in error. The overall $\bar{e}_{oc}$ for the transformer as a whole, found from the nearly horizontal lines in FIG. 8, will not be affected and the result of the actual swing in the primary and secondary $\bar{e}_{oc}$'s will be to smooth the voltage ripple at the load.

In another "balanced" method (B) of voltage regulation, $S_p$ is held constant and $e_{oc}$ in the secondary is reduced as L drops. This is accomplished (in part) by not replacing any of the discharging strings until two or more switching intervals has passed after the last exchange in the normal switching sequence. That is, the secondary batteries are allowed to discharge longer before exchanging of primary and secondary strings is resumed. Meanwhile, the $e_{oc}$ of each primary cell will be rising, not dropping. The resulting increase in the back e.m.f. will reduce the current flow in the primary, as is desired when L drops. However, unless some adjustment is made in the primary, the opposite of what is desired will result in both the primary and secondary when exchanging of strings therebetween is resumed. The differences in $E_{oc}$ between strings coming on charge or discharge and the rest of the primary or secondary strings will initially be abnormally large and will result in increased, rather than decreased, current flows. The average voltages on both sides of the transformer will then oscillate up and down, to a diminishing extent, as switching is continued, until the original equilibrium voltages are restored. Only a transitory decrease in $E_s$ will have been achieved.

To make the decrease permanent, i.e., to establish a new equilibrium in which $E_s$ is lower, the primary is adjusted by adding to each string coming on charge, from one to several batteries as necessary to lower $I_p$ and keep $E_p$ from rising (by increasing the back e.m.f. and the resistance of the string), as L drops below 1. Since this will reduce $E_p/N$, the "share" of $E_p$ across each cell (unit) in the string, the cells coming off charge (and going on discharge) will be less highly charged, i.e., will have a lower open circuit voltage, as is desired.

If the extra batteries are not returned to standby when the charged strings are put on discharge, the total number ($S_s N$) of batteries in the secondary will increase by $S_s \cdot \Delta N$. However, the only effect of this will be to lower the internal resistance, and hence the RI losses, in the secondary. (The effect on $E_s$ of the resistance decrease is more than countered by the effect of decreasing $\bar{e}_{oc}$.) Also, it is preferable, for obvious reasons, not to let extra batteries accumulate a higher charge (over several half cycles) than the rest of the batteries, which are discharged every other half-cycle.

Any or all of the extra batteries of course may contain less than 9100 cell units, i.e., less than the number comprised in the "regular" string batteries. In this case, the extra batteries preferably are "half" batteries, employed in multiples of 2, so that the pairs can be connected in series, and "carried along" as "whole" batteries of about the same $E_{oc}$ as the regular batteries, when the string is switched to discharge.

The quantitative effects on $\bar{e}_p$ and $\bar{e}_{oc}$ of successively higher N values, independently of $S_p$, are depicted in FIG. 8. FIG. 9 (upper half) shows how $S_p$, the number of strings required at a given load, varies with N.

Before discussing another method of voltage control, the way in which loss control effects the choice between methods A and B at a given load will be shown. The percent overall loss in the transformer is equal to $100(\bar{e}_p - \bar{e}_s) \div \bar{e}_p$, or $100(1 - \bar{e}_s/\bar{e}_p)$. The $\bar{e}_p$ and $\bar{e}_s$ values required to figure the internal loss at a given load and value of N can be read off from FIG. 8 but the loss is more accurately calculated from the preceding relationship, expressed as % loss/$100 = 1 - (17200 + 1250L) \div [(533,000 - 35776L)/N]$. The loss values so calculated are plotted (against 100L and N) in the lower half of FIG. 9. It is apparent from the figure that it is necessary to go to higher N values, as the percent load drops, in order to hold the internal losses at or below a given level. However, it is also apparent that capital costs (for the additional batteries) are increased when N (or $S_p$) is increased. Thus, loss and capital costs must both be considered in selecting the method of voltage control to be used for any actual transformer operation.

For the above assumed voltages, currents, and resistances, N can be held at 26, without exceeding a 4.6% internal loss, until 100L drops to about 92% of full load. If L is then increased to 27, the loss drops to only about 1%, but the number of strings required (for voltage control), rises dramatically, i.e., from about 6 or 7 to more than 25. If, instead, the number of strings is held constant at 10 and N is increased from 26 to 27, the percent on-time required for voltage control at a 92% load rises from about 73% to well over 100% (an impossibility).

It is then apparent that, as a practical matter, N will be kept at 26 and higher losses accepted until the load becomes smaller. Thus, if N is not increased until $L = \sim 77\%$, the loss will rise to about 6.5% (and then drop to about 3% at N=27) but the number of strings required will only jump from about 4 to about 9 (or % on-time with 10 strings will rise from about 44% to 90%).

From the foregoing discussion, it is evident that both of methods A and B are likely to be employed if the difference between maximum and minimum loads is very great. Both $S_p$ (or % on-time) and N will be manipulated. It is also clear that the particular $S_p$ and N values elected at successively lower loads will be influenced by loss and capital cost considerations.

In view of the latter conclusion, provision of a few more ("extra") batteries (modules) per string than the number required to hold internal losses below a preselected value at 100% load will permit voltage control to be achieved at a lower loss cost. This is conveniently done by including several extra batteries "at" the low voltage end of each (primary) string, so that they may be connected in appropriate series/parallel configurations with the corresponding "bottom" several batteries of the string. This is illustrated in FIG. 10, in which three extra batteries (marked with X's) are depicted in each of four different series/parallel configurations with the bottom three batteries of a 26 battery string. N, the number of batteries in series, increases from 26 to 29 as the successive configurations, from left to right, are assumed. $S_p$ is assumed to be held constant at 10, so the % on-time will be reduced between configuration changes, in order to maintain voltage control as the load drops.

To minimize switching complications (assuming rather frequent load swings of sufficient magnitude to require changes in N) the extra batteries are "carried along" when each string is switched to discharge. However, if such swings are infrequent, the extra batteries may be held in standby until needed.

A third method (C-1) of voltage control is "unbalanced", i.e., is not constrained to having the same number of strings on each side of the transformer or to equal half-cycle times. For example, as the load drops, the switching regime is altered so that the number of strings on discharge is increased and the number on charge is decreased correspondingly. Once the appropriate ratio of primary to secondary strings is established, exchange of strings at regular switching interval is resumed. The adjustment is made by switching charged strings to discharge but not in the reverse direction. Discharge of the strings initially in the secondary is prolonged and the added strings will discharge throughout an increased number of switching intervals. Thus, $\bar{e}_{oc}$ in the secondary will drop (as will $E_s$). The number of switching intervals during which the strings initially in the primary are charged before being switched to discharge will not alter. However, once exchanging of charged and discharged strings is resumed, the strings in the primary will only be on charge for a reduced number of switching intervals. By reducing the number of strings in the primary, the resistance therein is increased and this reduces $I_p$. As a consequence of the shortened charging time and because the $e_{oc}$ of the strings coming on charge (once exchanging has resumed) will be lower, the $e_{oc}$ of the strings going on discharge will be lower and the $\bar{e}_{oc}$'s on both sides of the transformer will rapidly attain "steady state" or equilibrium values.

In the latter method, all of the strings are kept in service and only their distribution between the primary and secondary is altered. This is an unnecessary constraint, however, and does not permit utilization of any of the ampere hours capacity of the system for peak-shaving.

In order to illustrate the least constrained method (C-2) of voltage control, values of L and $\bar{e}_{oc}$ have been calculated for different pairs of $S_p$ and $S_s$ values, which do not always total to the same value of S, and are tabulated in Table 2. These values were derived as follows, again assuming $e_{oc} = (e_p + e_s)/2$.

The minimum number of strings required at full load (assuming N=26 and ignoring finite switching time requirements), according to FIG. 10, is about 9.24 strings, on each side of the transformer. (This non-integral number corresponds to the actual value, $1.9 \times 10^{-4} \Omega$, for the resistance of the specific cell assumed earlier herein.) However, no difference in results obtains if the more convenient, integral number 9 is taken as the initial number of strings on each side of the transformer. The initial current through each cell in the transformer is then 1800/9=200 amps and the subsequent cell currents (at lower loads) in the primary and secondary, respectively, will be $i_p = 1800 \cdot L/S_p$ and $i_s = 1800 \cdot L/S_s$. However, $i_p r_c$ is equal to $(\bar{e}_p - \bar{e}_{oc})$, the average voltage drop across each primary cell, and $i_s r_c$ is equal to $(\bar{e}_{oc} - \bar{e}_s)$. Since $\bar{e}_p = (533{,}000 - 35{,}776 \cdot L) \div (9100 N)$, $\bar{e}_s = (17{,}200 + 1250 \cdot L) \div 9100$, N=26 and $r_c = 0.00019$, it follows that $(1800 \cdot L/S_p) \times 0.00019 = (533{,}000 - 35{,}776 \cdot L) \div (9100 \times 26) - \bar{e}_{oc}$ and $(1800 \cdot L/S_s) \times 0.00019 = \bar{e}_{oc} - (17{,}200 + 1250 \cdot L) \div 9100$. Then $\bar{e}_{oc}$ may be most simply calculated, from the latter relationship, in terms of $S_s$ and L, and L may be solved for, by eliminating $e_{oc}$ between the two relationships, in terms of both $S_p$ and $S_s$, i.e., 100L, the percent of full load, $= 125.67 \div (1 + 1.1851(1/S_p - 1/S_s))$ and $\bar{e}_{oc} = (0.3420/S_s + 0.13736) \cdot L + 1.8901$.

In Table 2, % load and $\bar{e}_{oc}$ values are given for various pairs of $S_p$ and $S_s$ values, $S_s$ ranging from 4 to 15 and $S_p$ from 4 to 11.

Load and $e_{oc}$ values were also calculated for the case in which N=27 and these are tabulated (in an alternative manner) in Table 3.

TABLE 2

| $S_s$ | | 11 | 10 | 9 | 8 | 7 | 6 | 5 | 4 |
|---|---|---|---|---|---|---|---|---|---|
| 15 | % L |  |  |  |  |  | 98.433 | 95.488 | 91.374 |
| | $\bar{e}_{oc}$ |  |  |  |  |  | 2.0478 | 2.0430 | 2.0365 |
| 14 | % L |  |  |  |  | 100.22 | 98.010 | 95.081 | 91.001 |
| | $\bar{e}_{oc}$ |  |  |  |  | 2.0522 | 2.0487 | 2.0439 | 2.0373 |
| 13 | % L |  |  |  |  | 99.698 | 97.515 | 94.614 | 90.573 |
| | $\bar{e}_{oc}$ |  |  |  |  | 2.0533 | 2.0497 | 2.0450 | 2.0384 |
| 12 | % L |  |  |  |  | 99.101 | 96.943 | 94.076 | 90.080 |
| | $\bar{e}_{oc}$ |  |  |  |  | 2.0545 | 2.0509 | 2.0461 | 2.0395 |
| 11 | % L |  |  |  | 100.06 | 98.404 | 96.277 | 93.448 | 89.504 |
| | $\bar{e}_{oc}$ |  |  |  | 2.0587 | 2.0559 | 2.0523 | 2.0475 | 2.0409 |
| 10 | % L |  |  | 100.52 | 99.211 | 97.581 | 95.488 | 92.705 | 88.823 |
| | $\bar{e}_{oc}$ |  |  | 2.0626 | 2.0603 | 2.0575 | 2.0539 | 2.0492 | 2.0425 |
| | % L |  | 100.52 | 99.469 | 98.190 | 96.593 | 94.542 | 91.814 | 88.004 |

TABLE 2-continued

| $S_s$ | | $S_p =$ | | | | | | |
|---|---|---|---|---|---|---|---|---|
| | | 11 | 10 | 9 | 8 | 7 | 6 | 5 | 4 |
| 9 | $\bar{e}_{oc}$ | | 2.0664 | 2.0645 | 2.0623 | 2.0595 | 2.0559 | 2.0511 | 2.0444 |
| | % L | 100.06 | 99.211 | 98.190 | 96.943 | 95.386 | 93.386 | 90.723 | 87.001 |
| 8 | $\bar{e}_{oc}$ | 2.0703 | 2.0688 | 2.0670 | 2.0647 | 2.0619 | 2.0583 | 2.0535 | 2.0468 |
| | % L | 98.404 | 97.581 | 96.593 | 95.386 | 93.878 | 91.940 | 89.357 | 85.744 |
| 7 | $\bar{e}_{oc}$ | 2.0734 | 2.0718 | 2.0700 | 2.0677 | 2.0649 | 2.0613 | 2.0565 | 2.0498 |
| | % L | 96.277 | 95.488 | 94.542 | 93.386 | 91.940 | 90.080 | 87.600 | 84.125 |
| 6 | $\bar{e}_{oc}$ | 2.0772 | 2.0757 | 2.0739 | 2.0716 | 2.0688 | 2.0652 | 2.0604 | 2.0536 |
| | % L | *91.314 | 91.314 | 91.314 | | | | | |
| | | (93.448) | (92.705) | (91.814) | 90.723 | 89.357 | 87.600 | 85.252 | 81.957 |
| 5 | $\bar{e}_{oc}$ | (2.0824)[1] | (2.0809) | (2.079) | 2.0768 | 2.0740 | 2.0704 | 2.0655 | 2.0587 |
| | % L | ← | | 84.308 | | → | 84.125 | 81.957 | 78.908 |
| 4 | $\bar{e}_{oc}$ | | | 2.078 | | | 2.0776 | 2.0728 | 2.0660 |

Note:
[1]When the calculated $\bar{e}_{oc}$ value exceeds 2.078 volts, the catholyte in an Na/S cell at 300° C. will be in the two-phase condition and the actual $\bar{e}_{oc}$ will be only 2.078 volts. $I_p$ will exceed $I_s$, the excess power being taken up in the primary, i.e., stored.

TABLE 3

| $S_s$ | | ΣS | | | | | | |
|---|---|---|---|---|---|---|---|---|
| | | 20 | 18 | 16 | 14 | 12 | 10 | 8 |
| 16 | $S_p$ | 4 | 2 | 0 | | | | |
| | % L | 71.616 | 58.735 | | | | | |
| | $e_{oc}$ | 2.0038 | 1.9833 | | | | | |
| 14 | $S_p$ | 6 | 4 | 2 | | | | |
| | % L | 76.617 | 71.060 | 58.360 | | | | |
| | $e_{oc}$ | 2.0141 | 2.0051 | 1.9845 | | | | |
| 12 | $S_p$ | 8 | 6 | 4 | 2 | | | |
| | % L | 78.819 | 75.771 | 70.331 | 57.868 | | | |
| | $e_{oc}$ | 2.0208 | 2.0158 | 2.0068 | 1.9861 | | | |
| 10 | $S_p$ | 10 | 8 | 6 | 4 | 2 | | |
| | % L | 79.458 | 77.571 | 74.616 | 69.335 | 57.192 | | |
| | $e_{oc}$ | 2.0264 | 2.0232 | 2.0181 | 2.0091 | 1.9882 | | |
| 8 | $S_p$ | 12 | 10 | 8 | 6 | 4 | 2 | |
| | % L | 78.819 | 77.571 | 75.771 | 72.950 | 67.894 | 56.208 | |
| | $e_{oc}$ | 2.0321 | 2.0298 | 2.0266 | 2.0215 | 2.0124 | 1.9913 | |
| 6 | $S_p$ | 14 | 12 | 10 | 8 | 6 | 4 | 2 |
| | % L | 76.617 | 75.771 | 74.616 | 72.950 | 70.331 | 65.620 | 54.640 |
| | $e_{oc}$ | 2.0390 | 2.0374 | 2.0351 | 2.0319 | 2.0268 | 2.0177 | 1.9963 |
| 4 | $S_p$ | 16 | 14 | 12 | 10 | 8 | 6 | 4 |
| | % L | 71.616 | 71.060 | 70.331 | 69.335 | 67.894 | 65.620 | 61.501 |
| | $e_{oc}$ | 2.0497 | 2.0485 | 2.0469 | 2.0446 | 2.0414 | 2.0364 | 2.0272 |

Assuming regular switching intervals, the number of intervals during which each string is charged or discharged will be the same as $S_p$ or $S_s$ (the time required to switch each string from charge to discharge, and vice versa, will be an intervening, small fraction of an interval, in each direction).

It is apparent from the tables that voltage control method C-2 affords a maximum of flexibility and permits very smooth adjustments as the load (gradually) drops, or rises, without typing up all of the batteries. That is, as the load drops, more strings may be utilized to take up the excess power (at the expense of higher internal losses in the transformer, of course). Thus, method C-2 is presently considered the most preferred way of achieving voltage control.

Those skilled in the art will recognize that the variety of "melds" of the several preceding methods which may be utilized, for optimum economics of operation, is limited only by computer and switching means capabilities. In general, however, the above exemplified basic variants will serve quite adequately for voltage control.

Transformer Start-up and Shut-down

In both start-up and shut-down, avoidance of excessive voltage and current transients is essential. An additional consideration is that shut-down of a transformer primary circuit which is part of a multiterminal system must be done without upsetting the rest of the system. The unique character of the transformer of the present invention permits this to be done at the transformer end of the line, rather than at the power house, in a relatively simple manner. (Also, the secondary can continue to operate, for a limited time period, even though the primary is taken out of operation.)

Start-up with all batteries at full charge voltage involves an initially abnormal operating condition. In ordinary operation, the open circuit voltages of the batteries, on each side of the transformer, range from the voltage of a battery coming off discharge to the voltage of a battery coming off charge. Accordingly, the effective (average) open circuit voltage at the secondary terminals, in normal operation, is less than the voltage of a battery coming off charge. However, the transformer can be started up with all batteries at full charge, without developing an excessive over-voltage at the customer end of the secondary circuit.

For example, in the case of a step-down transformer comprising 10 series strings of 26 batteries in the primary and 260 paralleled batteries in the secondary, a normal operating condition can be established in as few as 10 normal switching intervals. A catholyte composition of $Na_2S_{5.2}$ and an $e_{oc}$ of 2.078 volts (see FIG. 7) is assumed. If the internal resistance of the batteries in the secondary is 1.729 Ω/260, the secondary line resistance is 0.02671Ω, the full load resistance is 0.36752Ω and $e_{oc} = 9100 \times 2.078 \times 18910$ volts, then the initial current through the secondary load will rise rapidly to a maximum of 47,171 amps (vs a normal full load current of 46,800 amps) and the corresponding voltage across the load will be 17,336 volts (vs a normal load voltage of 17,200 volts). The over-voltage will be 136 volts, or only 0.791%.

The following protocol is used to rapidly bring the transformer to a normal steady-state condition. It is assumed that 10 series strings of 26 batteries each are on standby and 260 batteries have just been connected in parallel across the secondary terminals. One normal switching interval later, one "string" of 26 batteries is switched from discharge to standby (connected in series) and is replaced by one of the original "full charge" standby strings (connected in parallel). This is repeated 9 times more, another of the original secondary strings being exchanged with another of the original standby strings at the end of each successive switching interval. Immediately after the tenth switching operation, all of the standby strings are simultaneously connected across the primary terminals. At the end of each successive switching interval thereafter, the most highly charged primary string is exchanged with the most fully discharged secondary string, thereby maintaining the balanced, steady-state condition attained at the end of the 10th interval.

Thus, the secondary load is serviced with full load current at an acceptable voltage, immediately upon initiation of the operation, and the primary is "turned on" in normal operating condition only 20 seconds later, assuming a representative switching interval of 2 seconds.

Of course, if the transformer is to be put in operation at less than full load, the number of strings on each side may be different than was assumed above and the preceding protocol will be modified accordingly, in a manner made evident to those skilled in the art by the foregoing disclosure herein. Similarly, procedures appropriate to start-up of a step-up transformer will be apparent and do not require further discussion.

In shutting down a transformer of the present invention, care must be taken to provide an energy sink to take up the current which will flow during the inductive surge consequent upon attempted interruption of the established current in the primary (or secondary) circuit.

Very fast acting, vacuum interrupters have been shown capable, as individual devices in inductive circuits, of interrupting direct currents in excess of 15,000 amperes at 20,000 volts, and higher currents can be handled by parallel interrupters of this type (*HVDC Circuit Breakers*, P. Barkan; *IEEE. Trans. Power Apparatus Systems*, V. 914, 1575-81 (1972). Such interrupters would be suitable for fault clearing in the secondary circuit of a step-down transformer operated at the load and voltage conditions exemplified in the preceding discussions of switching and voltage regulation. Although interrupters with this capability will not be required for ordinary shut-down situations, they will usually be included in the system for fault protection. When present, they may as well be used (with advance notice to the customer(s)) for shutting down the secondary under non-fault conditions as well.

If the secondary line terminates in a (step-down) D.C. transformer of the instant type, the primary of the latter transformer may also be utilized to shut down the circuit.

Shut-down of the primary (high voltage) side of the transformer is considerably facilitated by utilizing "extra" batteries to increase the back emf in the primary. In a preferred embodiment of the present invention, several batteries more than is required for normal full-load operation will be held available (as shown in FIG. 10, for example) for inclusion in at least as many strings as are used in the primary. Extra batteries also may be available from the secondary if it has been or is being shut down. Another option is to obtain the "extra" batteries from a primary string which has been put on standby.

The extra batteries may be used to shut down (turn off) the primary of a step-down transformer as in the following protocol. An initial condition in which 9 series strings of 26 batteries (9100 cells each; internal resistance $1.729\Omega$) are connected (in parallel) across primary terminals at the end of a supply line having a resistance of 19.876 ohms and an inductance of 2 Henries is assumed. The voltage at the power house end of the line is assumed to be 533,000 volts. Also assumed are a primary current of 1820 amps and open circuit voltages ranging from 483,847 volts ($2.045 \times 9100 \times 26$) for string #1 to 490,847 volts ($2.0746^- \times 9100 \times 26$) for string #9. The calculated string currents range from 288.5 amps for string #1 to 132.8 amps for string #9.

The time intervals between the successive steps in the protocol need be only long enough for the series load breakers (LB-1 in FIGS. 3-5, for example) to operate and are not necessarily equal.

In the first step, strings 1 through 5 are simultaneously switched off. The resulting induced overvoltage of 13,502 volts (<3% of the original 496,816 volts across the primary terminals) decays to less than 100 volts in about 0.3 seconds. The transient maximum current through each of the remaining four strings will be about 455 amps, which is well within the capabilities of the battery cells (and switching circuit components) involved. When the transient has passed, the steady state primary current will have been reduced to 1386.6 amps.

In the next step, 3 extra batteries ($E_{oc} = 18,609.5$ volts each) are added to each of strings 1-5, thereby raising their average open circuit voltage to 541,842 volts (even string #1 now has an open circuit voltage above 533,000 volts).

In the third step, the augmented strings 1-5 are simultaneously reconnected across the primary terminals. That is, the appropriate disconnect switches are closed, but the series SCR's being biased by the reverse potential of $(541,842-533,000)/29 = \sim 305$ volts each, will not conduct even though gated. The current through strings 6-9 remains as it was.

In the fourth step, strings 6-9 are simultaneously disconnected. The line inductance causes the forward voltage to jump to $(1386.6 \times (19.867 + 29 \times 1.729/5) + 541,842) = 583,294$ volts. Strings 1-5 are gated on and the inductance discharges into them (charges them) until the voltage across it decays from 50,294 volts ($583,294 - 533,000$) to 8842 volts ($541,842 - 533,000$), or to $\sim 17.6\%$ of the initial value. Accordingly, about 0.2 time constants $(2/(19.876 + 29 \times 1.729/5) = 0.0669'')$, or about 134 milliseconds are required for the current through each series SCR to drop below the minimum holding level.

The primary has now been turned off. The theoretical minimum time required to carry out the sequence of four steps (three, actually, since steps 2 and 3 are simultaneous) is that required to disconnect strings 1-5, reconnect them with the extra batteries included and discharge the line inductance. Assuming that the series switching circuits are, for example, of the type, LB-1, shown in FIG. 3 (and discussed earlier herein), the switching time for each of steps 1 and 2,3 will be on the order of about 0.1 millisecond, giving a total of about 134.2 milliseconds for the operation.

The latter interval is considerably short of the "turn around" time of about 10 seconds required for the $C_1$ capacitors in the load breakers to recharge to a positive voltage after being discharged (and reverse charged) in step 1. However, so long as the $SCR_2$'s remain off, regating the $SCR_1$'s on does not depend on the charge on the condensers. Neither does step 4 require the use of the condenser/$SCR_2$ combination to achieve turn-off. It would then appear that rapidity of switching is not a problem in shutting down the primary, but the foregoing analysis is limited to functioning of the electronic switching elements involved and does not consider the time ($\sim$10 milliseconds) required to operate the disconnect/connect switches (DS-1 in FIG. 3), which will be electromechanical switches (having high withstand voltages).

Fault Protection

Those skilled in the art will recognize that the load-breaking and disconnect means employed for ordinary switching operations cannot be relied on to prevent excessive current flows when faults occur in either the input or output lines (or within the transformer installation itself). Accordingly, power distribution systems based on the present D.C. transformer will usually include interrupter devices capable of operating at the requisite speed for fault clearance in HVDC (high voltage D.C.) systems.

Protection against module-to-ground or module-to-module faults at the transformer is attained by minimization of faulting opportunities, and by use of circuit breakers.

To minimize faulting at the transformer, resort may be had to such expedients as isolation of the battery modules from ground on elevated platforms, mechanical shielding against falling objects, electrical shielding of buswork and disconnects with sulfur hexafluoride (in conduits and casings) and the use of optical fibers, rather than wires, for control signal transmission.

For protection against faults within individual cell units and batteries, and as the ultimate protection against external faults, the modules may be fused in two different ways. That is, each cell in the battery includes a fuse link which will "open" at an amperage below the cell burnout level and will then withstand a voltage difference at least several times greater than the open circuit voltage of the cell at full charge.

In addition, each module preferably includes at least one fuse means which will open at a lower amperage than the individual cell fuses but, when "open", will withstand a voltage difference substantially higher than the open circuit voltage of the module (battery) at full charge. When the (open circuit) battery voltage exceeds the maximum available fuse voltage rating, a plurality of fuses in series will be required. Since the cell units in large batteries will ordinarily be grouped in readily disconnected sub-modules, to facilitate replacement of failed units, it will be appropriate to provide each such sub-module with its own fuse.

The effects of external (line) faults will differ somewhat, according to whether the line is supplying power to or receiving power from a given transformer. If a fault occurs in the supply line, current will tend to flow from the transformer primary into the supply line, i.e., will tend to flow in reverse to the normal direction. This will oppose the inductive surge tending to maintain the normal current flow and will reverse bias the (series) switching thyristors. However, the reverse break-down voltage of the thyristors is likely to be exceeded and they will then reverse-conduct, unless the circuit is broken by a suitable means before the voltage can rise high enough to overpower them. The voltage rating required for the primary breaker is reduced below the nominal line voltage (about 500 Kv, for example) by the reverse breakdown voltage of the thyristors but the difference is of little practical consequence. The breaker must be rated to handle the full nominal current load (1800 amperes, for example) at the nominal line voltage. Individual devices designed to interrupt direct currents of the latter magnitude at such voltages are not yet commercially available. However, the combination of the "low oil" A.C. circuit breaker rated for 765 Kv (such as is manufactured by Sprecher & Schuh Ltd., Aarau, Switzerland) and a surge diverter-circuit, would appear to be usable as such a device.

If a fault occurs in the discharge line, the fault current will flow in the same direction as the normal current and the reverse break-down voltage of the (discharge) thyristors will have no effect on breaker requirements. Since the nominal line current will be quite high (about 47,000 amperes, assuming a step-down transformer with a primary current of 1800 amperes and a transformation ratio of 1 to 26, for example), a plurality of paralleled circuit breakers will be needed to interrupt the line current.

If the latter requirement is met by providing each module in the secondary with its own D.C. circuit breaker (rated to interrupt 1800 amperes at about 18 Kv, for example), additional protection is provided against faults within the secondary. Furthermore, the primary fault protection requirements can also be met by breakers of the latter type, in 1 to 1 series connection with the batteries comprised in each string. Thus, both primary and secondary line faults may be provided for, and internal fault protection maximized, by incorporating an individual D.C. breaker in each module. A design for a D.C. breaker of the low oil type, capable of interrupting nominal currents of up to 2000 amperes at arc voltages of up to 30 Kv, was disclosed in *Report 13-08; CIRCUIT-BREAKER FOR HVDC TRANSMISSION, D. Kind et al, CIGRE*, pages 1-9, (1968). Intensive development of other types of D.C. breakers with such capabilities is being carried out by several major electrical equipment manufacturers. For example, vacuum interrupters employed in combination with charged commutating capacitors and linear or saturable reactors have been shown to be capable of interrupting nominal currents of 8000 amperes at voltages of over 100 Kv: Anderson & Carroll *(General Electric Co., N.Y.) APPLICABILITY OF A VACUUM INTERRUPTER AS THE BASIC SWITCH ELEMENT IN HVDC BREAKERS; IEEE Transactions on Power Apparatus and Systems, Vol. PAS-97, #5, Sept./Oct.* 1978, pp. 1893-1900.

Conventional current-rise rate (dI/dt) sensing devices may be employed to actuate the circuit breakers.

By-Pass and Fuse Means

The type of battery cell most favored for the practice of the present invention is the hollow fiber type sodium/-sulfur cell, as described earlier herein. In this type of cell, the sodium which migrates out of the fibers, as discharge proceeds, is replaced by sodium from the anolyte reservoir above the tubesheet. If the sodium level in the reservoir drops too far (as on overdischarge of the cell, for example), contact between the sodium and the anodic electron collecting means will be essentially broken and the circuit through the cell develops a high resistance. A generally irreversible open circuit "failure" has then occurred.

Irreversible open circuit failure can occur by corrosion of the cathodic current collector, resulting in formation of high resistance surface coatings or even in substantial dissolution of the collector material in the catholyte (at abnormally high temperatures).

The former type of open circuit failure will not occur in types of alkali metal/chalcogen cells in which the hollow fibers are replaced by a single large tube (or by several smaller tubes) into which it is feasible to extend the anodic electron collecting means. However, the latter type of open circuit failure can occur in any such cell in which the cathodic current collecting means (which may consist of or include the catholyte container) is not practically immune to attack by the catholyte at the most elevated temperatures the cell may experience.

Another type of open circuit failure can occur in sodium/sulfur cells of any type if the sodium to sulfur ratio is high enough so that the cell can be overdischarged until the proportion of the sodium ions in the catholyte is sufficient to cause it to solidify. Although it may be possible to reliquify the catholyte by heating the cell to a higher temperature, the failure is—in effect—irreversible at the normal working temperature of the cell. Also, if the cell is of the hollow fiber type, the fibers are likely to be damaged when the catholyte solidifies.

Thus, alkali metal/chalcogen battery cells in general are subject to a type of failure (open circuit failure) which rarely, if ever, has been experienced by mechanically intact battery cells of other types.

It is not anticipated that hollow fiber type sodium/-sulfur cells will be excessively prone to failure by any mode but it must be recognized that the probability of open circuit failure (development of high internal resistance) will be somewhat higher for a battery cell in which the separator/electrolyte takes the form of hollow fibers.

Accordingly, it is essential to efficient practice of the present invention with series strings of cell units to provide a means of by-passing those units which have failed on open circuit (or otherwise) so that the string can continue to be used until enough units have failed to require taking it out of service.

It is also essential, from the standpoints of operability, economics and safety, to provide each cell with protection against excessive current flows, such as may result either from uncorrected line faults or from short-circuiting between or within modules. This is most simply and reliably accomplished by providing each cell with its own (series connected) fuse.

The manner in which the by-pass and fuse means cooperate is illustrated by considering the situation which exists in a battery of about 9100 cell units, each consisting of five hollow fiber type sodium/sulfur cells in parallel. Each cell has its own fuse and a single by-pass means is provided for each cell unit. An average charge-discharge amperage of 200 amps and a peak amperage of 400 amps is assumed.

Each fuse is rated to "blow" at about 120–150 amperes (and can be a section of the lead from one of the cell electrodes; an aluminum section about 0.06 to 0.08" in diameter, for example). A by-pass, such as the one illustrated in FIG. 11, for example, is connected, as shown, between the pair of conductors (not shown) to which the cell anodes and cathodes are commonly connected. That is, the by-pass means is in parallel with the cells making up the cell unit.

If one of the cells in a given unit fails on open circuit, the current through each of the unfailed cells in that unit increases by slightly less than 25% but the voltage drop (load voltage) across the unit does not change to any significant extent and the by-pass is not activated. Similarly, if one cell out of the five fails by short circuiting, its fuse blows and the effect is then the same as though the failed cell had open circuited. If additional cell of the unit fail—by either mode—the current through each of the remaining cells rises but the voltage remains essentially constant. However, if the last cell in the unit fails, by either mode, an arc will form across the cell (if the failure is by circuit opening) or across the fuse (if the cell fails by shorting). The voltage across the cell (unit) will now rise to whatever value the arc will sustain, from a minimum of about 10–20 volts, up to the difference between the open circuit and load voltages across the entire battery (or string of batteries). The by-pass is activated and the arc extinguishes when the shunt is established.

A variety of automatic by-pass means, such as—for example—magnetic (solenoid) operated switches or relays, break-down of thin film dielectric circuit blocks, initiation of gas discharges, etc., may be selected from according to the working conditions contemplated. FIG. 11 depicts a specific by-pass device (of a novel type) the construction of which will now be explained in detail.

Referring to FIG. 11-A, aluminum leads or "shunt rods" (1 and 2), 0.325 inches in diameter, are connected through expansion loops (not shown) to the + and − cell unit terminals (not shown). The latter rods terminate in end rings (3 and 4) which are of reduced thickness. Each ring is shrunk-fit around an end of a short, solid, 1010 steel cylinder (5 and 6) extending horizontally toward each other on a common axis and defining a 1/32" gap (7) between their inner ends. The outer ends of the steel cylinders are joined by weld beads (8 and 9) to end rings 4 and 3, respectively. A generally cylindrical, 1990 glass sleeve (10) surrounds and is hermetically joined with the surfaces of the steel cylinders 5 and 6 by an intervening thin layer (not shown) of "precoat" glass. The bottom portion of the sleeve is drawn out to form a seal (11) and the top portion is pierced by an opening (12) centered on a vertical diameter (of sleeve 10) which passes through the latter seal. A vertical, cylindrical, 1990 glass ampoule (13), having an upper section with an outer diameter of 0.144 inches and almost completely filled (at 300° C.) with 2.2 grams of mercury (14), has a flared, thick-walled, lower end (15) which is sealingly engaged with the upper surface of sleeve 10 around opening 12 therein and defines a thick-walled, capillary section (16) of the ampoule which terminates in a fragile, thin-walled tip (17). The latter tip intrudes into a chamber (18) which is defined jointly by member 15 and said upper surface of sleeve 10 and communicates with gap 7 through opening 12. The upper portion of ampoule 13 terminates in seal (26), has an inner diameter of 0.098 inches and is closely surrounded by, but does not touch, a 1.37 inches long heating coil (19) of 43 turns, spaced 0.016 inches apart, formed from a 1.8 foot length of 0.0159 inch diameter (B&S #26) nichrome wire and connected to shunt rods 2 and 1 by leads (20 and 21), respectively. The coil is surrounded in turn by a layer (22) of material equivalent in insulating ability of 0.01 inches of paper (K=62). The relative positions of elements 3–10 are maintained by means of a doubly-grooved, ceramic spacing block (23), two generally hemi-cylindrical saddles (24) and an encircling screw-adjusted, stainless steel clamp (25).

The by-pass unit of FIG. 11 is fabricated by:

(a) forming the ampoule (13 and 15), from 1990 glass, generally as shown but lacking tip 17 and including a short, open-ended length of small diameter glass tubing (not shown) extending from its top and communicating with the interior of the ampoule, and then utilizing the latter tubing length (to pressurize the ampoule interior) and heat, to form tip 17 as a thin-walled, bottom seal;

(b) applying a thin layer of pre-coat glass (of the type commonly employed in steel enameling) to the portion of each of cylinders 5 and 6 which will be engaged with sleeve 10, slipping the coated ends into a preformed, 1990 glass sleeve having a short side arm of glass tubing attached at its middle circumference, positioning the cylinders so that their adjacent ends are spaced apart about 1/32 inch (to form gap 7) and shrinking the sleeve on and bonding it to the pre-coated cylinder ends;

(c) utilizing the side arm and heat to form an opening 12 in the sleeve diametrically opposite to the side arm;

(d) fusing the flared lower portion 15 of the ampoule to the surface of sleeve 10 around opening 12;

(e) preforming shunt rods 1 and 2 (including the expansion loops) and the end rings 3 and 4, each ring being sized so that it will just slip onto a cylinder end (5 or 6) when both elements are at 400° C.;

(f) heating the ring ends and the sleeve and cylinder assembly to about 400° C., and slipping the ring ends onto the protruding cylinder ends, in such disposition that the vertical axes of the side arm and the portions of shunt rods 1 and 2 below the end rings are generally parallel to each other;

(g) heating the resulting assembly (and elements 23–25) to a somewhat higher temperature at which the fit of the end rings is loose enough to permit easily adjusting their positions, disposing block 23, saddles 24 and clamp 25 as shown, adjusting the rod end positions until the rod sections below them mate exactly with the block and saddles, tightening the clamp enough to exert a slight compressive force on the rods, forming weld beads 8 and 9—as by laser-welding—and allowing the assembly to cool slowly to room temperature;

(h) disposing pre-formed coil 19 around the ampoule 13, leads 20 and 21 being already attached to the coil, and laser-welding the free ends of the leads to ring end 4 and shunt rod 1, respectively, as shown;

(i) placing the assembly in a vacuum chamber, evacuating the ampoule 13, the chamber 18 and gap 7, melting off the side arm and forming seal 11, charging the ampoule with the mercury 14 and melting off the tubing length and forming seal 26; and (j) emplacing the insulating material 22.

The key consideration in designing a by-pass unit of the preceding type are as follows.

The unit must operate at voltage differentials (across the cell unit, on open circuit) ranging from the lowest to highest values which can be assumed by the difference between the load and open circuit voltages of the battery or battery string comprising the cell unit. Assuming an internal loss of 2.5% and an open circuit battery voltage of from 400 to 20,000 volts, the latter range will be from 10 to 500 volts. At the lower end of the range, the heating coil should provide enough heat to quickly raise the mercury temperature to a value (assume 400° C.) well above that (say 325° C.) required to expand the mercury to fully occupy the ampoule interior. (It is assumed that only about half of the heat liberated in the coil is taken up by the mercury.) At the higher end of the voltage range, the mass (heat capacity) of the nichrome coil must be such that although it will probably melt before the mercury is expanded enough to rupture the ampoule bottom (at a temperature below the softening temperature of the ampoule glass), the resulting melt will provide enough heat to complete the exapnsion.

In normal operation, the coil (and the shunt rod sections) constitute a high resistance shunt across the cell unit and the current through this shunt (at a normal voltage differential of about 2 volts) must be negligible in comparison to the normal string (or battery) current. At the voltages and amperages assumed above, the calculated cost of the $RI^2$ loss in the coil of FIG. 11 is 13 cents a year.

Once the shunt circuit has been completed, the relative rates of heat evolution in and heat losses from the shunt rods must be such that the glass employed in the by-pass will not be heated to a temperature above its annealing point. For the particular design described above, the temperature of the shunt rods—assuming a normal shunt current of 200 amperes and application of a radiative coating, such as graphite, to 0.325 inch diameter rods—is estimated to be about 50° C. above the working temperature of the cell unit, i.e., about 350° C. This is well below the annealing point of 1990 glass.

A further—and obvious—desideratum is a close match in the thermal coefficients of expansion of the sleeve (and ampoule) glass and the metal it is bonded to. The combination of 1010 steel (0.1% carbon) and 1990 glass is well known to provide a close match, whereas a substantially poorer match is attained between aluminum and the porcelains employed as enamels for aluminum. Also, aluminum is corroded by mercury. On the other hand, the electrical resistance of steel shunt rods would be excessive. Consequently, a compromise, such as is provided in the design of FIG. 11, is necessary.

Since the by-pass unit will be exposed, at temperatures around 300° C., to an atmosphere which may include $H_2S$, sulfur vapors or sulfur oxides, it is essential that the electrical contacts be enclosed within a hermetically sealed casing. In the design of FIG. 11, the contacts—the mercury and the spaced-apart cylinder ends—are sealed within the ampoule/sleeve assembly. (Also, heating of the mercury as a liquid, above its boiling point, 358° C., is made possible.)

It will be recognized that the by-pass unit of FIG. 11 does not provide a direct response to excessive heat evolution in the cell unit, such as can result from a malfunction of the temperature control system in a module. This is because high energy cells will generally be irreversibly damaged as a result of reaching temperatures substantially above their intended operating temperatures. Even if the cell is not ruined by reaction of the cathodic current collecting means (or of the anode material) with the catholyte, the heat liberated may be sufficient to require opening the casing—as by means of a fusible plug—to prevent development of an excessive pressure. (However, the cell will fail on open circuit as a consequence of catholyte drainage and the by-pass unit may then be activated by the resultant change in voltage across the cell unit.) Also, in order to activate the by-pass by heat evolution in a single cell in the unit, each cell would have to be provided with its own heat-sensing unit, which would add substantially to the cell unit cost.

Neither is the by-pass unit intended to prevent over- or undercharging of the cells it is associated with. Rather, the monitoring, computer and switching means in or associated with each module is relied on for this function.

Computer Control and Monitoring

It is evident from the following considerations that computer control (and monitoring) is essential to operation of the type of D.C. transformer disclosed herein.

Assuming the full load current supplied to the primary (at 497 Kv) is 1800 amperes, as many as ten battery strings (of up to 29 batteries each) may be employed on each side of the transformer and the interval between successive switching operations may be as short as 2 seconds. Thus, in each one minute interval, as many as $60/2 \times 4 \times 29 = 3480$ separate, coordinated switching operations must be carried out. (Each operation involves both load breakers and both disconnect switches in each module.)

In addition, the switching protocol must be altered, as the current demand on the secondary goes up and down, so that voltage regulation is achieved, and in the manner which ensures an optimum balance between battery utilization (as for peak shaving) and RI losses. This in turn necessitates essentially continuous monitoring of the current through and open and closed circuit voltages across each module. (The open circuit voltage of each module in a given string can be measured, with adequate accuracy, when the current goes to zero, during each successive switch from charge to discharge and vice versa.) The current and voltage readings are stored in the minicomputer associated with each module, and then transmitted to the central computer on request and utilized "in situ"—in conjunction with criteria supplied by the central computer in response—to control switching intervals, the appropriate series/parallel connections of the "extra" batteries in each string, etc.

Finally, it will also be highly useful to maintain lifetime and performance records for the cell units employed again, an obviously impractical task, without the aid of computer capabilities, for an installation comprising over five million ($20 \times 29 \times 9,100$) active cell units.

Maintenance

Since a finite cell lifetime must be assumed, a means of detecting and identifying cell units which need to be replaced is essential. This requirement is conditioned by the fact that cell units will generally be handled as sub-modules assembled from a number (say 10 to 100) of cell units (on a supporting framework and adapted to be readily connected to or disconnected from the sub-modules adjacent to it). Efficiency considerations rule out "pulling" (and replacing) a sub-module before it includes several by-passed (or otherwise non-functional) cell units. On the other hand, there will be a maximum permissible number of such units for a module, depending on the minimum open circuit voltage it must have at the end of the discharge half-cycle. Also, the extent to which variations in open circuit voltage among different modules can be tolerated (particularly on discharge) will be another factor. Yet another factor is the average number of cell units per day which become non-functional—a function of average in-service time and average service life.

The open circuit (and load) voltages reported for each battery to the central computer are compared to pre-established values, to determine whether or not the number of non-functional cell units in the battery is approaching the maximum number that can be tolerated. Those batteries requiring replacement of non-functional cell units are identified (by an assigned code number) in a periodic maintenance schedule print-out. The sub-modules, in each module so identified, which include at least a specified number of non-functional units will then be replaced.

In a preferred embodiment of the invention, the faulting hazards and connect-disconnect requirements inherent in connections between the sub-modules and the minicomputer are avoided by providing each sub-module with self-contained means for determining and indicating that it should be replaced. That is, any sub-module in which at least the specified number of cell units are by-passed (or otherwise non-functional) will identify itself by turning on a light source located at the outer surface of that portion of the insulated module housing behind (or below) which it is located. The light source will be activated when the difference between the maximum zero current voltage across the sub-module differs from the nominal voltage (2u volts; u being the number of cell units per sub-module) rises to a value equal to 2f, where f is the specified number (of non-functional units) referred to above.

Various solid state, electronic means, of known types, may be employed to monitor the latter voltage difference and to activate the light source. If this means is adapted for reliable, continuous operation at the working temperature of the cell units, it may be located within the interior of the sub-module, connected across the + and − common terminal (strips) to which the cell units (and their shunts) are connected. If not, it may be located just behind (or below) the light source in the insulating layer or in an intermediate location (between the insulation and the interior) where the cooling gas can circulate across it, and connected by leads to the terminal strips.

The power to operate the detecting means and the light source of course is taken from the sub-module itself. Conveniently, the detecting/activating means may comprise a Zener diode and an adjustable bridge circuit and the light source may be a light emitting diode (LED).

The value of f will initially be set to balance maintenance labor costs against capital costs for standby replacement units. This value is then adjusted, according to the actual failure rate being experienced, so that the number of sub-modules which must be pulled each day is essentially constant (does not vary by more than about ±5%, for example).

As an illustration, if the minimum number of good cell units required for a battery to be employed in the secondary of the transformer is 9100 and the battery consists of 1000 sub-modules of 10 units each, the maximum number of non-functional units which can be tolerated is 900 (9% of the total). The central computer might then be instructed to identify all modules containing 800 or more non-functional units and the value of f required to establish an essentially steady rate of sub-module replacement might be found to be 4 non-functional cell units per sub-module. (Sub-modules containing only 3 non-functional units will not identify themselves as requiring replacement and will not be pulled when the sub-modules which do require replacement are pulled.)

If a 10-year lifetime is assumed for the cell units and the transformer comprises 580 operating modules of 10,000 units each, the average replacement rate over a ten-year period will be $(580 \times 10,000) \div (10 \times 365.25) = 1588$ cell units/-day. At an f value of 4, this corresponds to about 400 sub-modules (out of 580,000) pulled each day.

The specific electrical quantities, switching circuits, by-pass means, etc., used or described herein are for purposes of illustration and are not to be construed as limiting the scope of the present invention in a manner inconsistent with the claims appended hereto.

What is claimed is:

1. A high power battery module adapted for use in D.C. transformers and multiterminal D.C. power distribution systems based on such transformers, said module comprising:
    (a) a battery of series-connected, rechargeable cell units, said battery having an open circuit voltage ($E_{oc}$) of at least 400 volts and each of said cell units consisting of a single cell or a plurality of cells in parallel and being capable of maintaining an electrical efficiency of about 95% or more while being continuously cycled for a period of at least 1000 hours, from the open circuit voltate ($e_{oc}$) it has when fully charged to a lesser $e_{oc}$, and back, at an average rate of at least 80 watts per pound of electrochemically reactive materials in the cell unit, said efficiency being defined as 100 ($W_o/W_i$), where $W_o$ is the total watt-hours delivered by the unit and $W_i$ is the total watt-hours supplied to it,
    (b) an individual means associated with each of said cell units and adapted to respond automatically to development of an excessive load voltage across said cell unit by establishing a by-pass connection across it so that the series circuit through the battery is maintained,
    (c) individual fuse means connected one to one in series with each of said cells,
    (d) switching means operable by control signals to make or break a discharge circuit through said battery and to break or make a charging circuit through said battery, said switching means comprising two connect/disconnect switches and a solid state load breaker, one of said switches being connected directly to one of the poles of said battery and the other switch being connected to the other pole through said load breaker,
    (e) automatic monitoring means for determining the voltage across said battery and the current therethrough, the latter means being adapted to supply an output, characteristic of the magnitudes of said voltage and current, to a means for developing said control signals, when a latter such control means is connected to said monitoring means,
    (f) connecting means by which said switching and monitoring means can be connected to said control means.

2. A D.C. transformer comprising a plurality of high power battery modules and a control means, each of said modules comprising:
    (a) a battery of series-connected, rechargeable cell units, said battery having an open circuit voltage ($E_{oc}$) of at least 400 volts and each of said cell units consisting of a single cell or a plurality of cells in parallel and being capable of maintaining an electrical efficiency of about 95% or more while being continuously cycled for a period of at least 1000 hours, from the open circuit voltage ($e_{oc}$) it has when fully charged to a lesser $e_{oc}$, and back, at an average rate of at least 80 watts per pound of electrochemically reactive materials in the cell unit, said efficiency being defined as 100 ($W_o/W_i$), where $W_o$ is the total watt hours delivered by the unit and $W_i$ is the toal watt-hours supplied to it,
    (b) an individual means associated with each of said cell units and adapted to respond automatically to development of an excessive load voltage across said cell unit by establishing a by-pass connection across it so that the series circuit through the battery is maintained,
    (c) individual fuse means connected one to one in series with each of said cells,
    (d) switching means operable by control signals to make or break a discharge circuit through said battery and to break or make a charging circuit through said battery, said switching means comprising two connect/disconnect switches and a solid state load breaker, one of said switches being connected directly to one of the poles of said battery and the other switch being connected to the other pole through said load breaker,
    (e) automatic monitoring means for determining the voltage across said battery and the current therethrough, the latter means being adapted to supply an output, characteristic of the magnitudes of said voltage and current, to said control means,
    (f) connecting means connecting said monitoring and switching means to said control means, said modules being so interconnected with each other—through said switching means—and so connected with said control means—through said monitoring and connecting means, as to be operable as a self-regulating, D.C. step-up or step-down transformer having electrically separate primary and secondary circuit sections, one of said circuit sections comprising a plurality of short legs connected in parallel and the other comprising a plurality of long legs connected in parallel, each short leg comprising one of said modules or a plurality of same in series connection, the total number of the latter modules therein being x, and each long leg comprising a series string of N of said modules, the number of legs in each of said primary and secondary sections being at least equal to the ratio of the total current through the section to the maximum permissible current through the individual component cell units in said modules, said switching means being adapted so as to be able, upon receipt of said control signals, to:

(a) disconnect one or more discharged secondary legs at a time and to subsequently connect the modules of which the latter legs consist to form at least one new leg for the primary and connect said new legs in the primary, (b) disconnect one or more old primary legs at a time and to subsequently connect the modules of which the latter legs consist to form at least one new secondary leg and connect said new secondary legs in the secondary, said control means being adapted to (1) determine, from the information provided by said monitoring means, what the open circuit voltage and internal resistance of each battery in the transformer is, (2) in accordance with said pre-established criteria, including the permissible internal volt-amperes losses, the relationship between $e_{oc}$ and ampere-hours capacity during charge and discharge of the cells of which the batteries are composed and the magnitude of the discharge current through the secondary, to determine when each of said legs should be taken off or put on discharge or charge, (3) to develop said control signals and to provide same, through said connecting means and at appropriate intervals, to said switching means, so that the batteries comprised in said short and long legs are repeatedly and alternately charged and discharged between preselected, higher and lower, open circuit voltages.

3. A module as in claim 1, wherein said cells are alkali metal/chalcogen battery cells.

4. A module as in claim 3, wherein said cells are of the hollow fiber type.

5. A D.C. transformer, according to claim 2, in which said cells are alkali metal/chalcogen battery cells.

6. A D.C. transformer as in claim 5, in which said cells are of the hollow fiber type.

7. A D.C. transformer, according to claim 2, in which each of said long legs additionally comprises from one to several such modules, connected in parallel with one or more of the modules in said leg.

8. A D.C. transformer, according to claim 7, in which the number of said additional modules is such that, when all of the modules in the leg are connected in series, $(E_p - N\overline{E}_{oc}) \div N\overline{R}_B$ at a preselected, minimum fractional value of L, will have essentially the same value as when L=1 and each of the additional modules is connected in parallel with another of said modules, and N is the total number of said modules connected in series, $R_B$ is the average resistance of the batteries in said N modules, $E_{oc}$ is the average open circuit voltage of the batteries in said N modules and L is the load and is 1 at full load.

9. A D.C. transformer, as in claim 2, constituting a terminal or sub-terminal in a D.C. power distribution system.

10. A multiterminal, D.C. power network comprising terminals which are D.C. transformers, each comprising a plurality of high power battery modules and a control means, each of said modules comprising:

(a) a battery of series-connected, rechargeable cell units, said battery having an open circuit voltage ($E_{oc}$ of at least 400 volts and each of said cell units consisting of a single cell or a plurality of cells in parallel and being capable of maintaining an electrical efficiency of about 95% or more while being continuously cycled for a period of at least 1000 hours, from the open circuit voltage ($e_{oc}$ it has when fully charged to a lesser $e_{oc}$, and back, at an average rate of at least 80 watts per pound of electrochemically reactive materials in the cell unit, said efficiency being defined as $100(W_o/W_i)$, where $W_o$ is the total watt-hours delivered by the unit and $W_i$ is the total watt-hours supplied to it, (b) an individual means associated with each of said cell units and adapted to respond automatically to development of an excessive load voltage across said cell unit by establishing a by-pass connection across it so that the series circuit through the battery is maintained, (c) individual fuse means connected one to one in series with each of said cells, (d) switching means operable by control signals to make or break a discharge circuit through said battery and to break or make a charging circuit through said battery, said switching means comprising two connect/disconnect switches and a solid state load breaker, one of said switches being connected directly to one of the poles of said battery and the other switch being connected to the other pole through said load breaker, (e) automatic monitoring means for determining the voltage across said battery and the current therethrough, the latter means being adapted to supply an output, characteristic of the magnitudes of said voltage and current, to said control means, (f) connecting means connecting said monitoring and switching means to said control means, said modules being so interconnected with each other—through said switching means—and so connected with said control means—through said monitoring and connecting means, as to be operable as a self-regulating, D.C. step-up or step-down transformer having electrically separate primary and secondary circuit sections, one of said circuit sections comprising a plurality of short legs connected in parallel and the other comprising a plurality of long legs connected in parallel, each short leg comprising one of said modules or a plurality of same in series connection, the total number of the latter modules therein being x, and each long leg comprising a series string of N of said modules, the number of legs in each of said primary and secondary sections being at least equal to the ratio of the total current through the section to the maximum permissible current through the individual component cell units in said modules, said switching means being adapted so as to be able, upon receipt of said control signals, to:

(a) disconnect one or more discharged secondary legs at a time and to subsequently connect the modules of which the latter legs consist to form at least one new leg for the primary and connect said new legs in the primary, (b) disconnect one or more old primary legs at a time and to subsequently connect the modules of which the latter legs consist to form at least one new secondary leg and connect said new secondary legs in the secondary, said control means being adapted to (1) determine, from the information provided by said monitoring means, what the open circuit voltage and internal resistance of each battery in the transformer is, (2) in accordance with said pre-established criteria, including the permissible internal volt-amperes losses, the relationship between $e_{oc}$ and ampere-hours capacity during charge and discharge of the cells of which the batteries are composed and the magnitude of the discharge current through the secondary, to determine when each of said legs should be taken off or put on discharge or charge, (3) to develop said control signals and to provide same, through said connecting means and at appropriate intervals, to said switching means, so that the batteries comprised in said short and long legs are repeatedly and alternately charged and discharged between preselected, higher and lower, open circuit voltages.

11. A D.C. transformer, according to claim 7, constituting a terminal or sub-terminal in a D.C. power distribution system.

12. A multiterminal, D.C. power network wherein all of the terminals are D.C. transformers according to claim 10.

13. A multiterminal, D.C. power network as in claim 12, wherein, in said D.C. transformers, each of said long legs comprises additional such modules connected in parallel with one or more of the modules in said leg, the number of said additional modules being such that, when all of the modules in the leg are connected in series, $(E_p - N\overline{E}_{oc}) \div N\overline{R}_B$ at a preselected, minimum fractional value of L, will have essentially the same value as when L=1 and each of the additional modules is connected in parallel with another of said modules, and N is the total number of said modules connected in series, $\overline{R}_B$ is the average resistance of the batteries in said N modules, $\overline{E}_{oc}$ is the average open circuit voltage of the batteries in said N modules and L is the load and is 1 at full load.

14. The transformer of claim 11 in which said cells are hollow fiber type, alkali metal/chalcogen battery cells.

15. The power network of claim 10, in which said cells are alkali metal/chalcogen battery cells of the hollow fiber type.

16. The D.C. network of claim 15, wherein said chalcogen is sulfur.

17. The D.C. transformer of claim 11 in which said cells are sodium/sulfur cells of the hollow fiber type.

18. The D.C. network of claim 13, in which the cells are sodium/sulfur cells of the hollow fiber type.

* * * * *

UNITED STATES PATENT AND TRADEMARK OFFICE
CERTIFICATE OF CORRECTION

PATENT NO. : 4,274,043
DATED : June 16, 1981
INVENTOR(S) : Robert G. Heitz

It is certified that error appears in the above—identified patent and that said Letters Patent is hereby corrected as shown below:

Column 3, line 37, correct spelling of "output";

Column 8, line 34, delete "either" and insert -- eight --;

Column 10, line 43, correct spelling of "cycles";

Column 12, line 33, insert -- a -- after "is";

Column 13, line 49, "t" in "the" should be capitalized;

Column 14, line 65, correct spelling of "discharges";

Column 15, lines 40 and 41, correct spelling of "dissipated";

Column 16, line 26, delete "high" and insert -- higher --;

Column 16, line 26, after the last letter in the line, a sub "o", should be a sub -- oc --;

Column 20, line 41, delete "reverse" and insert -- reserve --;

UNITED STATES PATENT AND TRADEMARK OFFICE
CERTIFICATE OF CORRECTION

PATENT NO. : 4,274,043
DATED : June 16, 1981
INVENTOR(S) : Robert G. Heitz

It is certified that error appears in the above—identified patent and that said Letters Patent is hereby corrected as shown below:

Column 20, line 56, delete "must" and insert -- most --;

Column 21, line 15, delete "as" and insert -- is --;

Column 26, line 17, insert the word -- the -- at the beginning of the line;

Column 28, line 41, the first-mentioned "$e_{oc}$" should have a horizontal line above the "e";

Column 29, line 50, delete "typing" and insert -- tying --;

Column 30, line 68, delete "X" after "2.078" and insert -- = --;

Column 32, line 50, insert a comma after "SCR's";

Column 36, line 23, the word "cell" should be plural;

UNITED STATES PATENT AND TRADEMARK OFFICE
CERTIFICATE OF CORRECTION

PATENT NO. : 4,274,043

DATED : June 16, 1981

INVENTOR(S) : Robert G. Heitz

It is certified that error appears in the above—identified patent and that said Letters Patent is hereby corrected as shown below:

Column 37, line 12, delete "of" and insert -- to --;

Column 37, line 16, insert a comma after "circling";

Column 38, line 4, "consideration" should be plural;

Column 41, Claim 1, line 42, delete "voltate" and insert -- voltage --;

Column 43, Claim 8, line 61, insert a horizontal line above the letter "R" at the beginning of the line;

Column 43, Claim 8, line 63, insert a horizontal line above the letter "E" at the beginning of the line.

Signed and Sealed this

First Day of December 1981

[SEAL]

*Attest:*

GERALD J. MOSSINGHOFF

*Attesting Officer*     *Commissioner of Patents and Trademarks*